(12) United States Patent
Pandey et al.

(10) Patent No.: US 9,448,404 B2
(45) Date of Patent: Sep. 20, 2016

(54) MODIFYING VIRTUAL OBJECT DISPLAY PROPERTIES TO INCREASE POWER PERFORMANCE OF AUGMENTED REALITY DEVICES

(71) Applicant: QUALCOMM Incorporated, San Diego, CA (US)

(72) Inventors: Umesh K. Pandey, Mumbai (IN); Chandrasekar Srinivasan, Hyderabad (IN); Babak Forutanpour, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 280 days.

(21) Appl. No.: 13/757,175

(22) Filed: Feb. 1, 2013

(65) Prior Publication Data

US 2014/0132484 A1 May 15, 2014

Related U.S. Application Data

(60) Provisional application No. 61/725,708, filed on Nov. 13, 2012.

(51) Int. Cl.
*G02B 27/01* (2006.01)
*G06T 11/60* (2006.01)
(Continued)

(52) U.S. Cl.
CPC .......... *G02B 27/017* (2013.01); *G02B 27/0172* (2013.01); *G06T 11/60* (2013.01); *G06T 19/006* (2013.01); *G02B 2027/014* (2013.01); *G02B 2027/0112* (2013.01); *G02B 2027/0118* (2013.01); *G02B 2027/0138* (2013.01); *G06T 19/20* (2013.01)

(58) Field of Classification Search
CPC ............. G09G 5/00; G09G 3/36; G09G 5/10
See application file for complete search history.

(56) References Cited

U.S. PATENT DOCUMENTS 7,505,034 B2   3/2009 Nguyen
7,917,773 B2   3/2011 Xu et al.
(Continued)

FOREIGN PATENT DOCUMENTS

WO   WO-2012118573 A1   9/2012

OTHER PUBLICATIONS

Sato, et al., "Fast Image Synthesis of Virtual Objects in a Real Scene with Natural Shadings," Systems and Computers in Japan,Systems and Computers in Japan, vol. 36, No. 14, pp. 102-111, 2005.

(Continued)

*Primary Examiner* — Michael Faragalla
(74) *Attorney, Agent, or Firm* — Kilpatrick Townsend & Stockton LLP

(57) ABSTRACT

Various arrangements for controlling a head-mounted display of an augmented reality display are presented. A head-mounted display may be provided and may be configured to present a virtual field of view comprising a virtual object superimposed on a real-world scene. A controller may be provided and configured to modify display of the virtual object by the head-mounted display based on a first color of a real-world object in the real-world scene. The virtual object in the virtual field of view may be superimposed over the real-world object. A lumen output of the head-mounted display for displaying the virtual object may be decreased.

32 Claims, 10 Drawing Sheets

(51) Int. Cl.
   *G06T 19/00* (2011.01)
   *G06T 19/20* (2011.01)

(56) References Cited

U.S. PATENT DOCUMENTS

| | | | |
|---|---|---|---|
| 8,957,916 B1 * | 2/2015 | Hedman | G09G 5/00 345/633 |
| 8,970,571 B1 * | 3/2015 | Wong et al. | 345/207 |
| 2002/0044152 A1 * | 4/2002 | Abbott et al. | 345/629 |
| 2002/0057280 A1 | 5/2002 | Anabuki et al. | |
| 2004/0233171 A1 | 11/2004 | Bell et al. | |
| 2007/0011140 A1 | 1/2007 | King et al. | |
| 2012/0154557 A1 | 6/2012 | Perez et al. | |
| 2012/0212467 A1 * | 8/2012 | Kohtoku | 345/207 |
| 2012/0327116 A1 | 12/2012 | Liu et al. | |
| 2013/0241805 A1 | 9/2013 | Gomez | |
| 2014/0132629 A1 | 5/2014 | Pandey et al. | |

OTHER PUBLICATIONS

International Search Report and Written Opinion—PCT/US2013/066458—ISA/EPO—Dec. 23, 2014.

Argenta C. et al., "Graphical User Interface Concepts for Tactical Augmented Reality", SPIE, XP040535787, 2010, pp. 1-12.

Grasset R. et al., "Image-Driven View Management for Augmented Reality Browsers", IEEE International Symposium on Mixed and Augmented Reality 2012 Science and Technology Proceedings, Nov. 5, 2012, pp. 177-186.

Kalkofen D, et al., "Visualization Techniques for Augmented Reality," Handbook of Augmented Reality, Springer Science and Business Media, LLC, Retrieved from the Internet: URL:http:jjwww.magicvisionlab.comjpubjkalkofen bookchapter11/paper.pdf, 2011, pp. 65-98.

Rosten E. et al., "Real-Time Video Annotations for Augmented Reality," Advances in Visual Computing Lecture Notes in Computer Science, LNCS, Springer, Berlin, DE, Jan. 1, 2005, pp. 294-302.

* cited by examiner

MODIFYING VIRTUAL OBJECT DISPLAY PROPERTIES TO INCREASE POWER PERFORMANCE OF AUGMENTED REALITY DEVICES

CROSS-REFERENCES TO RELATED APPLICATIONS

This application claims priority from U.S. Provisional Patent Application No. 61/725,708, filed Nov. 13, 2012, entitled "Modifying Virtual Object Display Properties to Increase Power Performance of Augmented Reality Devices", which is hereby incorporated by reference, as if set forth in full in this document, for all purposes.

BACKGROUND OF THE INVENTION

An augmented reality (AR) device, which may include a head-mounted display (HMD), may allow a user to view a real-world scene while also viewing and/or interacting with one or more virtual objects (e.g., text, graphics) displayed to the user by the HMD of the AR device. An HMD of an AR device may be in the form of goggles or glasses. For example, AR glasses may use a camera to capture images of a real-world scene being viewed by the user of the AR device and provide information relevant to the real-world scene and/or information with which a user is interested in interacting.

Due to AR devices being electronic, an AR device requires a power source in order to power its components (such as the HMD of the AR glasses, a processor, and/or a wireless interface). Since AR devices may be intended to be mobile and worn by a user while everyday tasks are being performed, one or more batteries may be used to power AR devices such that the user is not tethered to a power outlet or other form of power source. To have sufficient power to operate an AR device for a reasonable amount of time, batteries may need to be present in the AR device that make the AR device larger, heavier, and/or more expensive than if the batteries were reduced in size, complexity, and/or capacity.

SUMMARY

In some embodiments, a system for controlling an augmented reality display is presented. The system may include a head-mounted display configured to present a virtual field of view comprising a virtual object superimposed on a real-world scene. The system may include a controller, configured to modify a display of the virtual object by the head-mounted display based on a first color of a real-world object in the real-world scene. The virtual object in the virtual field of view may be superimposed over the real-world object. The controller may be configured to decrease a lumen output of the head-mounted display for displaying the virtual object.

Embodiments, of such a system may include one or more of the following: The controller may be further configured to modify the display of the virtual object by using a second color to display, via the head-mounted display, the virtual object that contrasts with the first color of the real-world object. The second color may have at least a predefined amount of color contrast with the first color of the real-world object. The predefined amount of color contrast may be determined based on a minimum distance between the first color and the second color in the Lab color space. The system may further comprise a battery, wherein the controller is further configured to modify the display of the virtual object if a charge level of the battery is below a predefined threshold. Power consumption of the head-mounted display may be decreased by decreasing the lumen output of the head-mounted display for displaying the virtual object. The controller may be further configured to modify the display of the virtual object by moving the virtual object to be displayed, via the head-mounted display, from a first location to a second location within a virtual field of view of the head-mounted display. The controller may be further configured to wait a predefined period of time before moving the virtual object from the first location to the second location within the virtual field of view of the head mounted display. The system may a camera, configured to monitor a focus of a user's eyes. The controller may be further configured to decrease a brightness level of the virtual object when the user's eyes are focused away from the virtual object.

In some embodiments, a method for controlling an augmented reality display is presented. The method may include presenting, by a head-mounted display, a virtual field of view comprising a virtual object superimposed on a real-world scene. The method may include modifying a display of the virtual object based on a first color of a real-world object in the real-world scene, wherein the virtual object in the virtual field of view is superimposed over the real-world object. The method may include decreasing a lumen output of the head-mounted display for displaying the virtual object.

Embodiments of such a method may include one or more of the following: The method may include modifying the display of the virtual object by using a second color to display, via the head-mounted display, the virtual object that contrasts with the first color of the real-world object. The second color may have at least a predefined amount of color contrast with the first color of the real-world object. The method may include determining the predefined amount of color contrast based on a minimum distance between the first color and the second color in the Lab color space. The method may include modifying the display of the virtual object if a charge level of a battery coupled with the augmented reality display is below a predefined threshold. The method may include decreasing power consumption of the head-mounted display by decreasing the lumen output of the head-mounted display for displaying the virtual object. The method may include modifying the display of the virtual object by moving the virtual object from a first location to a second location within a virtual field of view of the head-mounted display. The method may include waiting a predefined period of time before moving the virtual object from the first location to the second location within the virtual field of view of the head mounted display. The method may include monitoring a focus of a user's eyes. The method may include decreasing a brightness level of the virtual object when the user's eyes are focused in a direction away from the virtual object.

In some embodiments, an apparatus for controlling an augmented reality display is presented. The apparatus may include means for presenting a virtual field of view comprising a virtual object superimposed on a real-world scene. The apparatus may include means for modifying a display of the virtual object based on a first color of a real-world object in the real-world scene. The virtual object in the virtual field of view may be superimposed over the real-world object. The apparatus may include means for decreasing a lumen output of the head-mounted display for displaying the virtual object.

Embodiments of such an apparatus may include one or more of the following: The apparatus may include means for modifying the display of the virtual object by using a second color to display, via the head-mounted display, the virtual object that contrasts with the first color of the real-world object. The second color may have at least a predefined amount of color contrast with the first color of the real-world object. The apparatus may include means for determining the predefined amount of color contrast based on a minimum distance between the first color and the second color in the Lab color space. The apparatus may include means for modifying the display of the virtual object if a charge level of a battery coupled with the augmented reality display is below a predefined threshold. The apparatus may include means for decreasing power consumption of the head-mounted display by decreasing the lumen output of the head-mounted display for displaying the virtual object. The apparatus may include means for modifying the display of the virtual object by moving the virtual object from a first location to a second location within a virtual field of view of the head-mounted display. The apparatus may include means for waiting a predefined period of time before moving the virtual object from the first location to the second location within the virtual field of view of the head mounted display. The apparatus may include means for monitoring a focus of a user's eyes. The apparatus may include means for decreasing a brightness level of the virtual object when the user's eyes are focused in a direction away from the virtual object.

In some embodiments, a computer program product residing on a non-transitory processor-readable medium for controlling an augmented reality display is presented. The computer program product may comprise processor-readable instructions configured to cause a processor to cause, via a head-mounted display, a virtual field of view to be displayed comprising a virtual object superimposed on a real-world scene. The processor-readable instructions may be further configured to cause the processor to modify a display of the virtual object based on a first color of a real-world object in the real-world scene, wherein the virtual object in the virtual field of view is superimposed over the real-world object. The processor-readable instructions may be further configured to cause the processor to decrease a lumen output of the head-mounted display for displaying the virtual object.

Embodiments of such a computer program product may include one or more of the following: The processor-readable instructions may comprise processor-readable instructions configured to cause the processor to modify the display of the virtual object by using a second color to display, via the head-mounted display, the virtual object that contrasts with the first color of the real-world object. The second color may have at least a predefined amount of color contrast with the first color of the real-world object. The processor-readable instructions may comprise processor-readable instructions configured to cause the processor to determine the predefined amount of color contrast based on a minimum distance between the first color and the second color in the Lab color space. The processor-readable instructions may comprise processor-readable instructions configured to cause the processor to modify the display of the virtual object if a charge level of a battery coupled with the augmented reality display is below a predefined threshold. The processor-readable instructions may comprise processor-readable instructions configured to cause the processor to decrease power consumption of the head-mounted display by decreasing the lumen output of the head-mounted display for displaying the virtual object.

Additionally or alternatively, embodiments of such a computer program product may include one or more of the following: The processor-readable instructions may comprise processor-readable instructions configured to cause the processor to modify the display of the virtual object by moving the virtual object from a first location to a second location within a virtual field of view of the head-mounted display. The processor-readable instructions may comprise processor-readable instructions configured to cause the processor to wait a predefined period of time before moving the virtual object from the first location to the second location within the virtual field of view of the head mounted display. The processor-readable instructions may comprise processor-readable instructions configured to cause the processor to monitor a focus of a user's eyes. The processor-readable instructions may comprise processor-readable instructions configured to cause the processor to decrease a brightness level of the virtual object when the user's eyes are focused in a direction away from the virtual object.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
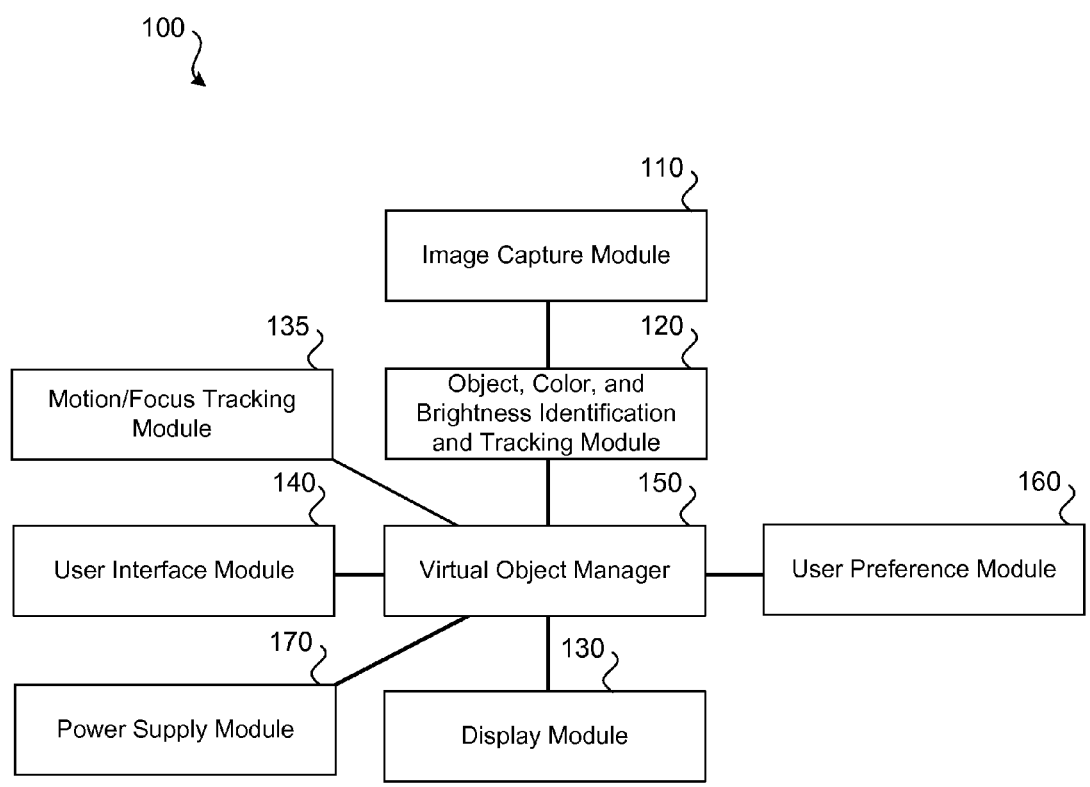
FIG. 1 illustrates an embodiment of a system configured to present virtual objects via a head mounted display.

A head-mounted display (HMD) which may be part of an augmented reality (AR) device, such as augmented reality glasses, may be used to superimpose virtual objects over a real-world scene being viewed by a user. The user, who is wearing the HMD and using the AR device, may view the real-world scene that contains real-world objects, such as other persons and physical objects. The AR device may present information as virtual objects, which are superimposed on the real-world scene, to the user. The virtual objects may be presented in such a manner such that only the user can view the virtual objects via the HMD, other persons may be substantially prevented from seeing the virtual objects as presented by the HMD. Therefore, while using an AR device, a user may view a real-world scene that is superimposed with one or more virtual objects for viewing only by the user. Interacting with these one or more virtual objects may involve the user moving and/or focusing his eyes to read or otherwise view the virtual objects.

To decrease the size and/or weight of an AR device, the power consumption of the AR device may be decreased in order to permit one or more physically smaller and/or smaller charge capacity batteries to be used, while still maintaining a reasonable operating time of the AR device on a battery charge.

In order to decrease the amount of power consumed by an AR device, the lumen output, a measure of visible light, of the HMD of the AR device may be decreased. An HMD of the AR glasses, which may involve the use of one or more pico projectors, may consume less power as the lumen output of the HMD decreases. While decreasing the lumen output of an HMD of an AR device can result in a decrease in power consumption, for the AR device to remain useful to the user, it is necessary for the user to be able to sufficiently see the virtual objects being displayed by the HMD of the AR device. In order to maintain visibility of the virtual objects presented to the user when the HMD's lumen output is decreased, the color, brightness, and/or location of the virtual objects presented by the AR device may be modified.

First, by adjusting one or more colors used to display a virtual object, the virtual object presented by the HMD of an AR device may remain visible to the user while the display is operating at a lower lumen output if the one or more colors used to present the virtual objects contrasts with the colors of the portion of the real-world scene upon which the virtual object is superimposed. For example, if a user is looking through an HMD of an AR device at the sky (which may be light blue), a virtual object may be presented to the user using orange (text and/or graphics). By using orange text or graphics, the lumen output of the HMD used to display the virtual object to the user may be set lower than if the virtual object had been presented to the user using another color, such as white, while still remaining adequately visible to the user. If the user adjusts his view so that the user is now looking at a real-world scene of the ground (e.g., blacktop of a road), the same virtual object may be presented to the user using white (text and/or graphics). Again, in this example, by using white text or graphics, the lumen output of the HMD used to display the virtual object to the user may be set lower than if the virtual object had been presented to the user using another color, such as black, while still remaining adequately visible to the user. Therefore, by changing a display color of a virtual object and reducing a lumen output of the HMD (compared to the lumen output if the display color was not modified), a decrease in the amount of power consumed by the HMD may be realized.

While the previous example relies on orange and white, similar adjustments can be made for various colors. As such, by adjusting the color of information to maintain a high amount of contrast with real-world objects that the virtual object superimposes, the virtual object can be made sufficiently visible with a lower lumen output of the AR device's display.

Second, a measurement of the brightness of real-world objects upon which a virtual object is superimposed by the HMD of an AR device may be used to reduce the lumen output of the HMD. If a real-world object upon which a virtual object is superimposed by an AR device is not brightly illuminated, the virtual object may not need to be displayed with a high lumen output in order for the virtual object to be sufficiently visible to the user. If the real-world object brightens (e.g., a light is turned on in the room and the real-world object now appears brighter), the lumen output of the display of the virtual object may be increased to maintain sufficient visibility of the virtual objected for the user. Further, the focus on the user's eyes may be taken into effect. If the user is not looking in the direction of a virtual object and/or the user's eyes are not focused on the virtual plane on which virtual objects are projected, the brightness of the virtual objects may be decreased. For example, if a user is not looking at text being presented as a virtual object to the user, it may not be important that the text is readable; rather, the text may only need to be bright enough to be readable if the user is focusing his eyes on the text.

Third, a virtual object being presented by an HMD of an AR device to a user may be displayed by the HMD of the AR device where the objects present in the real-world scene are darker or otherwise more conducive to having virtual objects superimposed over them. For example, if a user is looking at a movie screen, the areas off to the side of the movie screen are likely to be fairly uniformly dark. A virtual object being presented to the user by the AR device may be presented in these areas such that a lower lumen output from the HMD of the AR device is needed for the virtual object to be sufficiently visible to the user. If the user moves his head, and the movie screen now occupies a region of the real-world scene that was previously dark, one or more virtual objects may be moved from being displayed in front of the movie screen to being superimposed over part of the real-world scene that is now darker. Such movement may only occur if the scene viewed by the user has remained sufficiently static for a period of time (e.g., looked in a particular direction for at least a threshold period of time).

In addition to information being positioned in a region of a scene based on brightness, a priority can be assigned to different regions of a real-world scene based on objects identified in the real-world scene and/or by tracking the user's eye movements. For instance, in a real-world scene, faces, text (e.g., books, magazines), and electronic devices may be likely of interest to the user and may be assigned a high priority. Other regions of the real-world scene, such as ceilings, floors, table tops, and walls may likely be of less interest to a user. The AR device may determine a priority for each of these regions and may superimpose virtual objects for display in the lowest priority regions. As an example, if a user is viewing an email application (in this example, the virtual object) with the AR device and the user looks down at a magazine, the email application may be positioned for display by the AR device's HMD so that text and graphics of the magazine are not obscured by the email application.

Whether color, brightness and/or position of a virtual object is adjusted to conserve power, the "aggressiveness" of the modifications may increase as the battery charge level decreases. Increasing the aggressiveness of the modification may involve: increasing the frequency of color, brightness and/or position modification; decreasing brightness by a greater amount, more frequently adjusting the color of the virtual object such that brightness may be decreased and/or more frequently repositioning virtual objects such that brightness may be decreased. As an example, virtual objects may not be repositioned and/or change color when a battery has greater than a 50% charge. However, when below 50%, the virtual objects may be periodically rearranged or changed in color such that the brightness of the HMD and the power used by the AR device are decreased.

Such manipulation of virtual objects may be performed by a "window manager." Virtual objects, which represent the information being presented to the user via the virtual field-of-view (FoV) of the HMD of the AR device, may be repositioned within the virtual FoV in response to the priority of the different regions of the real-world scene being viewed by the user. As such, the execution of each application may be unaffected, rather only the position (and, possibly, brightness and/or color) within the virtual FoV, as controlled by the window manager, may be modified.

FIG. 1 illustrates an embodiment of a system 100 configured to display virtual objects using an HMD to a user. System 100 may include image capture module 110, object, color, and brightness identification and tracking module 120, display module 130, motion/focus tracking module 135, user interface module 140, virtual object manager 150, user preference module 160, and power supply module 170. Other embodiments of system 100 may include fewer or greater numbers of components. System 100 may be or may be part of an augmented reality device. Such an AR device may be worn or otherwise used by a user.

Image capture module 110 may be configured to periodically capture an image of a real-world scene that is being viewed by a user wearing or otherwise using system 100. For instance, image capture module 110 may include an image capture device that is positioned to capture a field-of-view of a real-world scene that is being viewed by a user. Image capture module 110 may include one or more cameras. The camera may be pointed such that it captures images of a scene viewed by the user. Image capture module 110 may capture images rapidly. For instance, multiple frames may be captured by image capture module 110 every second. Some or all of these images may be processed to determine the location of various objects within the real-world scene, such as persons and their identities.

Images captured by image capture module 110 may be passed to object, color, and brightness identification and tracking module 120. Object, color, and brightness identification and tracking module 120 may perform multiple functions. First, the colors present within the real-world scene may be identified. For one or more regions of the real-world scene, the colors and/or the predominant color may be identified. Second, the brightness of regions of the real-world scene may be identified. For one or more regions of the real-world scene, the brightness level may be determined. Third, real-world objects within the scene may be classified and tracked. For instance, the position of persons, faces, screens, text, objects with high color and/or texture variability, floors, ceilings, walls, regions of a similar color and/or brightness level, and/or other objects within the real-world scene may be identified and/or tracked. For the purposes of this disclosure, any visible item in the real-world scene may be considered a real-world object. The color, brightness, and/or classification of real-world objects within the real-world scene may be evaluated to determine how virtual objects should be presented to the user.

Display module 130 may serve as the output device to present virtual objects to the user. Display module 130 may be a head mounted display (HMD). For instance, display module 130 may include a projector that either projects light directly into one or both eyes of the user or projects the light onto a reflective surface that the user views. In some embodiments, the user wears glasses (or a single lens) onto which light is projected by the display module 130. Accordingly, the user may view virtual objects and real-world objects present in the scene simultaneously. A superimposed virtual object may be semi-transparent such that the user can still at least partially see a real-world object, such as a person's face, behind the virtual object. Display module 130 may be configured such that only the user can view the virtual objects. To other persons present in the vicinity of the user, since display module 130 may be a HMD, the virtual objects may not be substantially visible. As such, to other persons in the vicinity of the user, it may not be possible to discern whether display module 130 is or is not presenting the user with one or more virtual objects and/or if the virtual objects are superimposed over the faces or heads of persons present in the scene. Based on input from virtual object manager 150, the color, position, and/or brightness of virtual objects may be set and/or modified. The less light that is output by display module 130, the less power that display module 130 may use. As such, as a simplified example, if display module 130 decreases its lumen output by 50%, the power consumed by display module 130 may decrease by approximately 50%. Accordingly, minimizing or, more generally, decreasing the lumen output of display module 130 while maintaining sufficient visibility of virtual objects to the user may be desired.

Motion/focus tracking module 135 may be used to determine an angle of the user's head and/or the direction of the user's eye focus. To track the angle of the user's head, an accelerometer or gyroscope may be used. In some embodiments, depending on the angle of the user's head, virtual objects superimposed on persons' faces may be unanchored from the faces for display. Motion/focus tracking module 135 may include a camera or other form of eye tracking device that may be used to determine where the focus of the user's eyes are directed. As such, motion/focus tracking module 135 may be able to determine the direct the user is looking and/or the depth at which the user's eyes are focused. Accordingly, it may be possible to determine whether the user's eyes are focused on a virtual plane on which virtual objects are presented or on a real-world object within the real-world scene.

User interface module 140 may permit the user to provide input to system 100. For example, user interface module 140 may be a bracelet that has one or more buttons on it. The user may actuate these buttons to provide input to system 100. For example, the user may want to provide rankings of virtual objects and/or person, activate/deactivate superimposition of faces, and/or interact with virtual objects (e.g., open an email within the user's email account). While a bracelet is one form of user interface, it should be understood that various other user interfaces may be used for a user to provide input, such as a voice-recognition module or eye-tracking module which may be incorporated with motion/focus tracking module 135.

Virtual object manager 150 may serve to adjust the color, brightness, and/or position of virtual objects that are displayed to a user via display module 130. Virtual object manager 150 may not control the content of virtual objects, which may be controlled by separately executing applications. Rather, the color, position, and/or brightness of the virtual objects may be controlled via virtual object manager 150. Virtual object manager 150 may access a user preference module 160 for use in determining the appropriate color, position, and/or brightness level to use for virtual objects. Virtual object manager 150 may receive input from object, color, and brightness identification and tracking module 120. For instance, based on the objects, colors, and/or brightness identified by identification and tracking module 120, virtual object manager 150 may recolor, adjust brightness, and/or re-position virtual objects. Virtual object manager 150 may not affect the content of virtual objects.

User preference module 160 may be stored using a computer-readable storage medium configured to store user preferences. User preference module 160 may allow the user to specify: how much brighter virtual objects are to be as compared to the real-world object the virtual object is superimposed over, what colors are permitted to be used to increase contrast of virtual objects, how much contrast should be used (possibly defined as a distance in the Lab color space) and a ranking of preferable positions for virtual objects as superimposed on real-world scenes (e.g., on ceilings, floors, and wall). User preference module 160 may also store other user preferences.

Power supply module 170 may supply system 100 with power. Power supply module 170 may include one or more batteries. The size, capacity, and/or cost of power supply module 170 may be decreased by reducing the amount of power required by display module 130. Additionally or alternatively, the length of time system 100 can function on a single charge of power supply module 170 may increase by reducing the amount of power required by display module 130. Accordingly, by adjusting the color, brightness, and/or position of virtual objects by a virtual object manager 150, the length of time system 100 can function on a single charge of power supply module 170 may increase and/or the size, capacity, and/or cost of power supply module 170 may be decreased.

Figure 9:
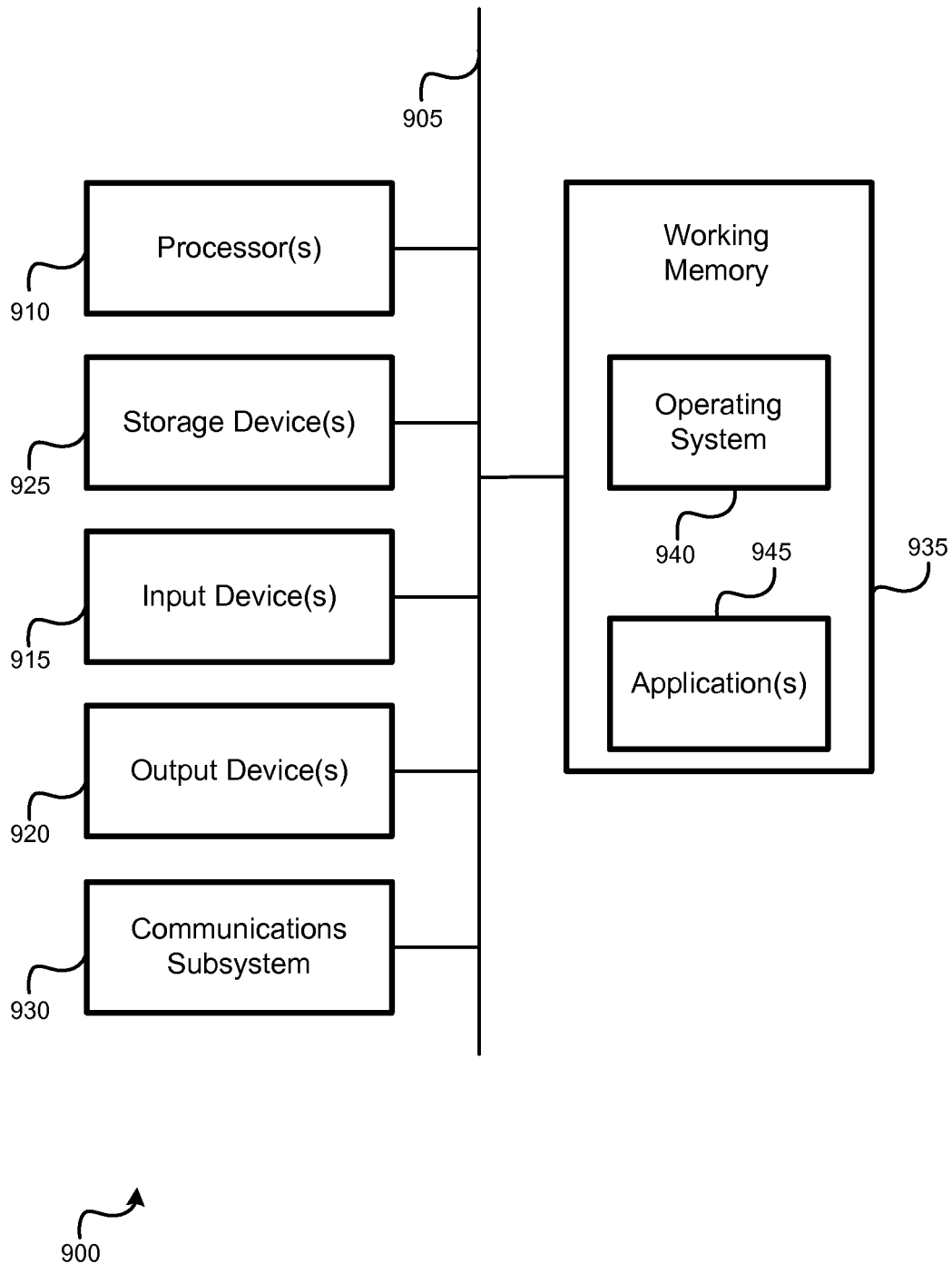
FIG. 9 illustrates an embodiment of a computer system.

At least some of the module of system 100 may be implemented using a computerized device, such as computer system 900 of FIG. 9. The modules of system 100 may be combined or divided into fewer or greater numbers of modules. Multiple modules may be implemented by a computerized device. For instance, virtual object manager 150 may be implemented as instructions executed by a computerized device (e.g., a processor, computer system).

Figure 2A:
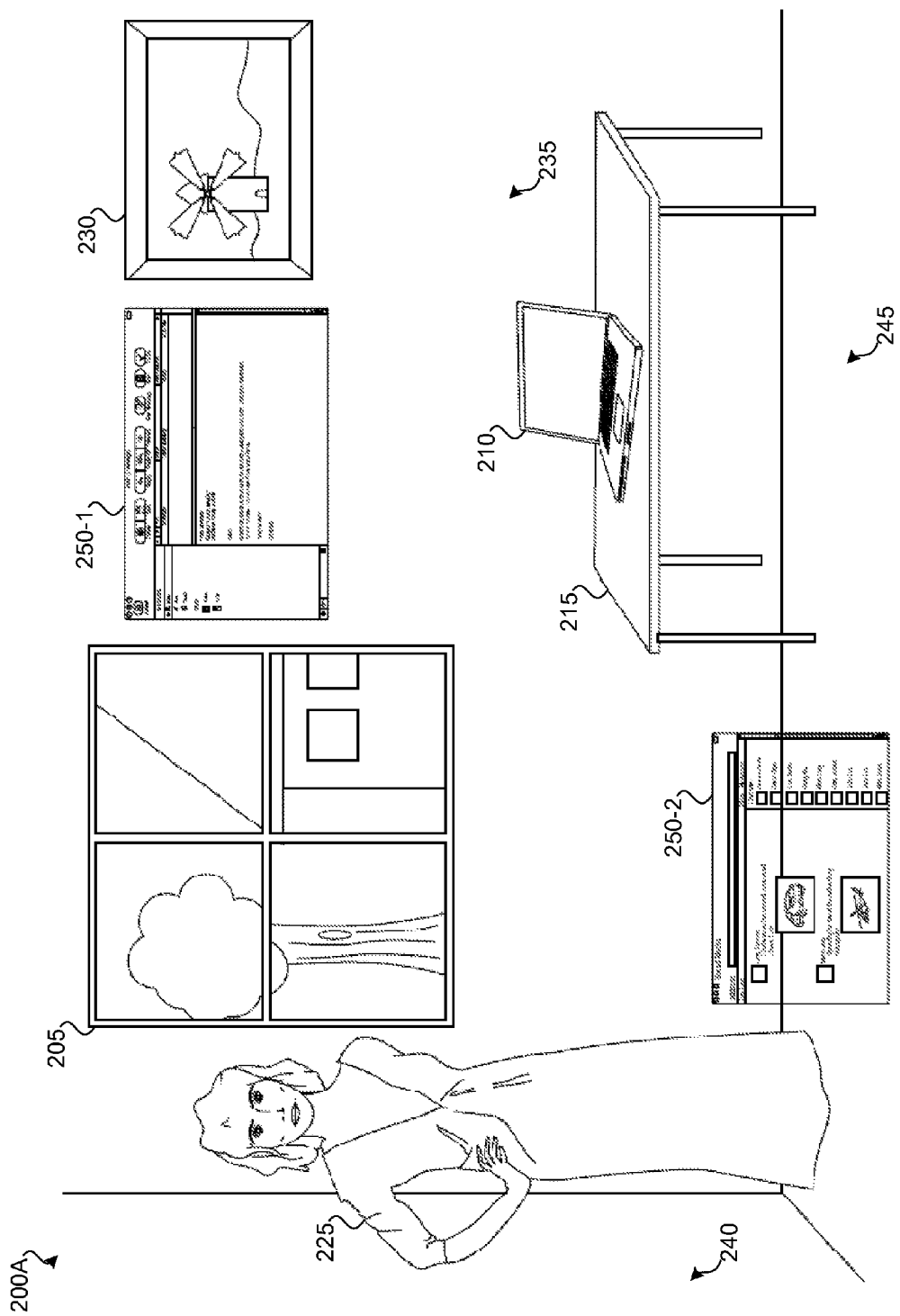
FIG. 2A illustrates an embodiment of a first-person point of view of a head-mounted display being used to present virtual objects to a user in which the brightness, color, and position of the virtual objects have been adjusted based on the real-world scene.

FIG. 2A illustrates an embodiment of a first-person point-of-view 200A of a head-mounted display being used to present virtual objects to a user in which the brightness, color, and/or position of the virtual objects is adjusted based on the real-world scene. In the first-person point-of-view 200A of FIG. 2A, the real-world scene contains multiple real-world objects, including: window 205, display 210, desk 215, person 225, picture 230, wall 235, wall 240, and floor 245. Virtual objects 250 are superimposed for display by an HMD of an AR device over the real-world objects of the scene.

In the illustrated embodiment of first-person point-of-view 200A, two virtual objects 250 are superimposed over portions of the real-world scene. The locations, colors, and/or positions of the virtual objects 250 may be determined based on the real-world objects present within the scene (and as present in images captured by the AR device). Referring to virtual object 250-1, this location to display virtual object 250-1 may be selected based on the brightness of wall 235. Wall 235 may be less bright than window 205 and display 210 of the laptop computer. Further, based on an established priority, wall 235 may have a lower priority than person 225, display 210, picture 230, and window 205. Accordingly, by displaying virtual object 250-1 over wall 235, real-world objects assigned a higher priority may remain fully visible to the user. The brightness and color of virtual object 250-1 may be determined based on visual properties of wall 235. The color or colors of virtual object 250-1 may be selected to increase (or maximize) contrast with wall 235. This may be accomplished according to a stored "color wheel." Colors on opposite sides of a color wheel may be referred to as complementary. Colors on opposite side of a color wheel may result in a high contrast. As such, if wall 235 is blue, a yellow or orange color (from the opposite side of the color wheel) may be selected for use in displaying virtual object 250-1. By using yellow or orange, the brightness of the display that is presenting virtual object 250-1 to the user may be decreased while allowing virtual object 250-1 to remain sufficiently visible to the user.

Based on the determined brightness of wall 235 where virtual object 250-1 is being projected, the brightness of virtual object 250-1 may be determined. For example, based on a lumen measurement of wall 235 in the region where virtual object 250-1 is being projected, the lumen output of the display for virtual object 250-1 may be determined. The lumen output of a virtual object for display to the user may be maintained at least a threshold amount above the lumen output of a real-world object upon which the virtual object is projected. The lumen output may also be based on the one or more colors being used to display a virtual object: due to properties of the HMD and/or the user's eyes, certain colors may be easier to perceive contrast with the background color of the real-world object than other colors.

Referring to virtual object 250-2, this location to display virtual object 250-2 may be selected based on the brightness of floor 245 and wall 235. Floor 245 may be less bright that window 205 and display 210. Further, based on an established priority, floor 245 and wall 235 may have a lower priority than person 225, display 210, picture 230 and window 205. Because of objects on wall 235 and virtual object 250-1 already superimposed over a region of wall 235, virtual object 250-2 may be superimposed over (at least part of) the floor. Accordingly, by displaying virtual object 250-2 over floor 245, real-world objects assigned a higher priority may remain fully visible to the user. The brightness and color of virtual object 250-2 may be determined based on properties of floor 245 and wall 235.

One or more colors of virtual object 250-2 may be selected to increase (or maximize) contrast with floor 245. According to a stored color wheel, if floor 245 is brown, a green or teal color may be selected for use in displaying virtual object 250-2. By using green or teal, the brightness of the display that is presenting virtual object 250-2 to the user may be decreased while allowing virtual object 250-2 to remain sufficiently visible to the user. Also, based on the determined brightness of floor 245 and wall 235 where virtual object 250-2 is being (or is to be) projected, the brightness of virtual object 250-2 may be determined. For example, based on a lumen measurement of floor 245 in the region where virtual object 250-2 is being projected, the lumen output of the display for virtual object 250-2 may be selected. The lumen output of brightness for a virtual object may differ from the lumen output of the display for another virtual object. As such, virtual object 250-1 may be projected by an HMD with a different lumen output than virtual object 250-2.

A direction and/or depth of focus of a user's eyes may affect the colors and/or brightness of a virtual object. If a user is not looking at a virtual object and/or the user is not focusing his eyes on the virtual plane on which the virtual objects are presented, the virtual object may be decreased in brightness. For instance, if a user is looking at person 225, the brightness of virtual object 250-2 and virtual object 250-1 may be decreased. If the user is looking at virtual object 250-1, the brightness of virtual object 250-1 may be increased and the brightness of virtual object 250-2 may be increased slightly. The brightest virtual object may be the virtual object that the user is looking at. All virtual objects may be brightened if the user is focusing his eyes on the virtual plane. All virtual objects may be decreased in brightness if the user is focusing on a real-world object beyond the virtual object plane. If the user appears to be focusing on a real-world object, virtual objects that are superimposed over the real-world object or are near to superimposing the real-world object may be resized, moved, and/or made more transparent (by decreasing the brightness). Virtual objects that are at least a threshold distance from the user's line of sight may remain unmodified in size, position, and/or brightness. When the user's eye focus returns to the virtual object, which may have been repositioned, resized, blurred, or made more transparent, the virtual object may return to its previous display state in size, position, brightness, and/or sharpness.

It should be understood that first-person point-of-view 200A is for example purposes only, the locations, colors, and brightness used to project virtual objects may vary based on a particular real-world scene and/or user preferences. While the above description focuses on the position, color, and brightness of virtual objects being adjusted, it should be understood that only a subset of these properties may be adjusted, possibly based on user preferences. For instance, in some embodiments, color may not be adjusted, with only position and brightness of virtual objects adjusted.

The above description focuses on virtual objects being moved to regions of low priority for display to the user. It should be understood that alternatively or additionally, the size of a virtual object may also be adjusted. For instance, in order to fit within a region of low importance, the size of the virtual object may be decreased. If the region of low importance grows, the size of the virtual object may be grown to occupy a greater portion of the region of low importance.

In FIG. 2A, no part of the user is visible. However, it should be understood, that if the user extends his arm and/or looks down, some portion of the user may be visible, such as the user's hand and/or arm. When the user is looking at or near his hand or arm, the user may desire to watch what be is doing (such as handling or manipulating an object). As such, virtual objects may be made transparent, blurred, moved and/or resized to allow the user to clearly view the user's hand and/or arm. As such, the user's own body may be afforded a high priority. The user's hand and/or arm may be detected via skin tone recognition. Once a user has completed handling or manipulating an object, virtual objects may be enlarged, repositioned, sharpened, and/or brightened to occupy at least some of the scene previously occupied by the user's hand and/or arm.

As another example of when a virtual object may be resized, if a user is having a face-to-face conversation, such as with person 225, the face of the person may occupy a significant portion of the scene if the user and the person are standing near each other. If the person's face occupies greater than a threshold percentage of the scene, some or all virtual objects may be reduced in size such that the person's face is not obscured. In some embodiments, only virtual objects that overlap the person's face may be resized.

Further, in some embodiments, gyroscopes and/or accelerometers may be used to detect when the user's attention has shifted. For instance, if the user quickly moves his head in a particular direction, it may be assumed that the user's attention has shifted and some or all of the virtual objects may be minimized or otherwise obscured from display for at least a threshold period of time or until the user provides input requesting the redisplay of the virtual objects.

Figure 2B:
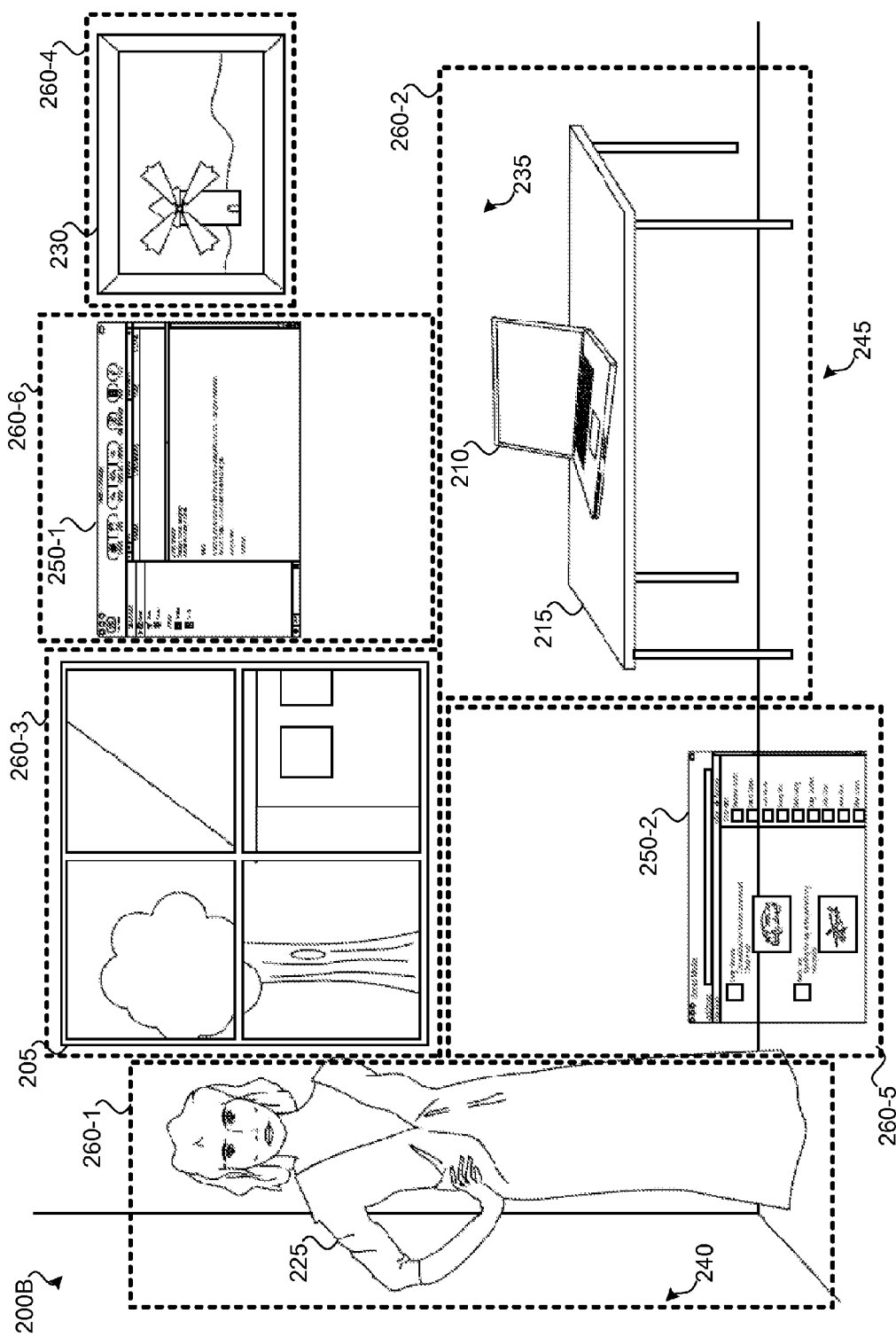
FIG. 2B illustrates an embodiment of a first-person point of view of a head-mounted display with regions of different priority illustrated.

FIG. 2B illustrates an embodiment of a first-person point-of-view 200B of a HMD with regions of different priority illustrated. As discussed in relation to FIG. 2A, different priority levels may be assigned to different portions of a virtual field of view superimposed over a real world scene. Based on the real world objects present within the real-world scene, different regions may be defined and assigned a priority. In FIG. 2B, six regions are defined and assigned a priority. For illustration purposes only, these regions are outlined in imaginary dotted boxes. Region 260-1 is defined to contain person 225 and is awarded the highest priority (e.g., based on the presence of a person). Region 260-2 is defined to contain display 210 and desk 215 and is awarded the second highest priority (e.g., based on being objects the user may desire to view and/or interact with). Region 260-3 is defined to contain window 205 and is awarded the third highest priority. Region 260-4 is defined to contain picture 230 and is awarded the fourth highest priority. Region 260-5 is defined to contain floor 245 and wall 235 and is awarded the fifth highest priority. Region 260-6 is defined to contain part of wall 235 and is awarded the least priority of regions 260. Regions that have the least priority may be used first to display virtual objects. As such, the two displayed virtual objects are displayed in the regions of the virtual field of view that correspond to the lowest priority real world objects in the scene.

The classification of various types of regions may be set by a user. For instance, a user may specify, via user preferences, that windows are high priority. This may be because the user likes looking out the window without his view being obscured by a virtual object. The user may set floors and walls as low-priority, thus such classified regions may be used first for superimposition of virtual objects. Table 1 illustrates an exemplary ranking system used for classifying regions within a real-world scene. If a particular classification from the table is not present within a real-world scene, this classification may not be used for determining priority.

TABLE 1

| Classification | Priority |
| --- | --- |
| Person | 3 |
| Text | 2 (Never) |
| "Blank space" (e.g., wall, floor, ceiling) | 7 |
| Display devices (e.g., televisions, monitors) | 5 |
| Vehicles | 4 |
| Furniture | 6 |
| User's body | 1 (Never) |

According to exemplary Table 1, virtual objects may be displayed over regions with the least priority. As such, if present in a scene viewed by a user, blank space may be used to present virtual objects. If no blank space is present within a real-world scene or the blank space has already been superimposed with virtual objects, the next-lowest priority region may be used. In the example of Table 1, any furniture (e.g., tables, chairs) may be superimposed with virtual objects. If none are present or the furniture that is present has already been superimposed with virtual objects, display devices, if present, may be superimposed with virtual objects. In some embodiments, certain priority levels may never be superimposed with virtual objects. For instance, certain classifications may be set to never be superimposed with virtual objects. In the example of table 1, the user's own body and text present in the real-world scene are never superimposed with virtual objects. The user, via user preferences, may specify classifications which are never superimposed with virtual objects.

Figure 3:
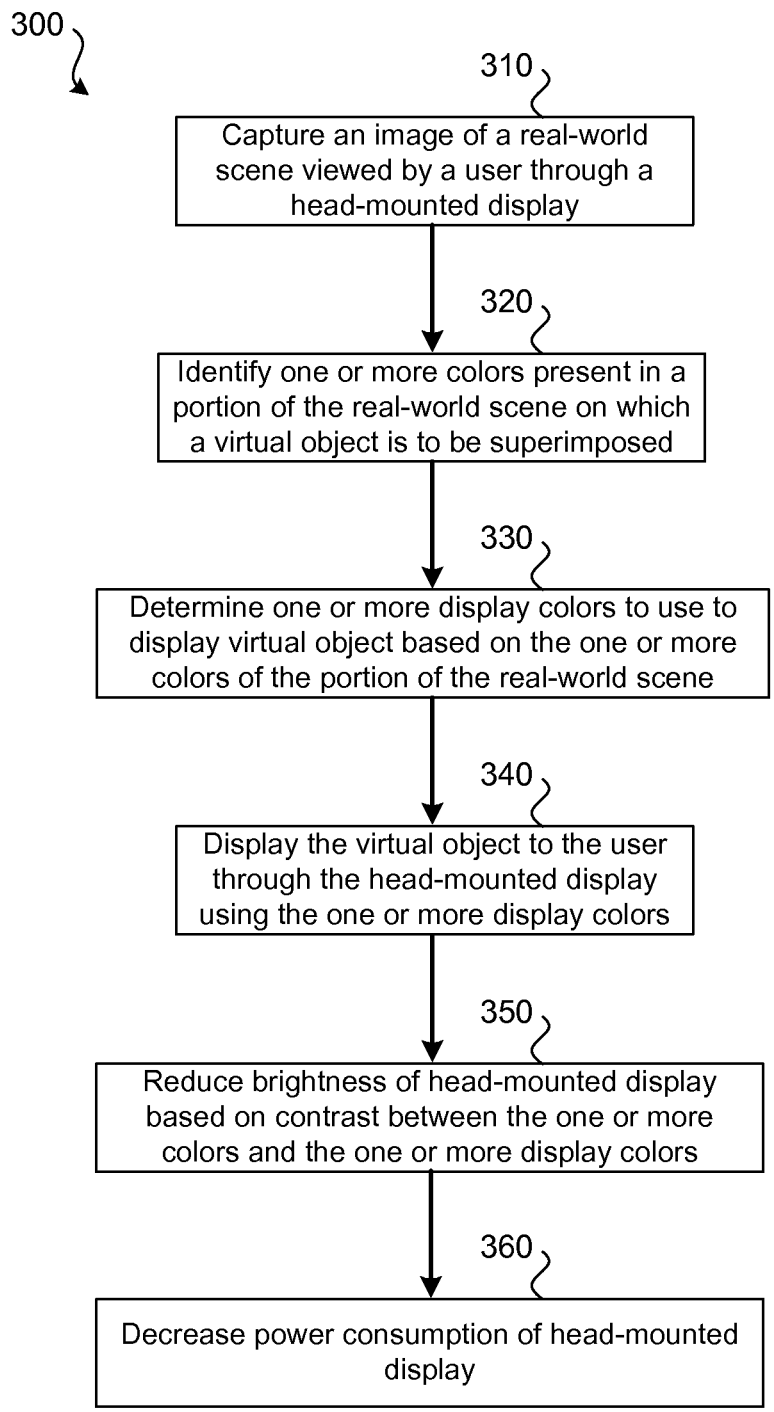
FIG. 3 illustrates an embodiment of a method for adjusting the color of a virtual object in response to a real-world scene.

Various methods may be performed using the system of FIG. 1. Various methods may be performed to position, adjust the color, and/or adjust the brightness of an AR device's HMD. FIG. 3 illustrates an embodiment of a method 300 for adjusting the color of a virtual object in response to objects of a real-world scene. Method 300 may be performed using an augmented reality (AR) device, such as an AR device that includes system 100 or some other system that is configured to display virtual objects using an HMD to a user. A computerized device, such as computer system 900 of FIG. 9 may be used to perform at least some blocks of method 300. Means for performing method 300 include one or more: computerized devices, cameras, head-mounted displays, and power sources. Means for performing method 300 may include one or more of the modules of system 100. Means for performing method 300 may include one or more processors.

At block 310, an image of a real-world scene may be captured by an AR device. Such an image may be captured using a camera. The camera may be directed to capture the same or a similar point of view as the user's eyes. As such, an image captured by the camera may contain a field of view that intersects the user's field of view. Images may be captured periodically, such as multiple times per second. Such images may be passed to a processing module of the AR device.

At block 320, one or more colors present in a region of a real-world scene on which a virtual object is currently superimposed or is going to be superimposed may be determined. To determine the colors, the image captured at block 310 may be analyzed. If multiple colors are present in the region of the real-world scene on which the virtual object is or is going to be superimposed, the predominate or average color may be determined. For example, if the region of the real-world scene is a wall covered in wall paper that is light gray with thin black pinstripes, the predominate color may be determined to be light gray. In some embodiments, an RGB component for each pixel in the region of the image over which the virtual object is or will be superimposed may be averaged to determine an average color. Using such an RGB component may factor in the brightness of the pixels (the greater each component value, the greater the measured brightness).

In some embodiments, rather than only using the color of the region of the real-world scene on which the virtual object is to be superimposed, a predefined number of pixels around the virtual object from the image captured at block 310 may additionally or alternatively be used to determine the one or more colors to be used for displaying the virtual object.

At block 330, one or more display colors may be determined using the one or more colors, predominant color, or average color identified at block 320. In order to maximize (or at least increase) contrast between the background of the real-world scene and the virtual object superimposed on the region of the real-world scene, complementary colors may be determined, such as colors on opposite sides of a color wheel. User preferences (such as colors to use or not use) may be used in determining which colors are selected for use in displaying virtual objects.

In using a stored color-wheel, the predominate color or average color of the region over which the virtual object is to be superimposed may be located on the color wheel. To select a high contrast color to use in displaying the virtual object, a color on the opposite side of the color wheel may be selected. This contrasting color may be located along a line through the center of the color wheel. In some embodiments, a color complimentary to the contrasting color may be used. This complimentary color may be located by moving a predetermined distance clockwise or counter-clockwise around the color wheel from the contrasting color.

Rather than using a stored color wheel, the Lab color space may be used to determine a contrasting color that provides sufficient contrast for viewing by the user. In the L-a-b color space, L defines lightness, a defines red to green, and b defines yellow to blue. The predominant or average color of the region of the real-world scene may be located in the Lab color space. The color used for displaying the virtual object may be required to be at least a predefined distance away from the location of the average or predominant color in the Lab color space. In some embodiments, the one or more colors of the virtual object may not be modified unless the one or more colors fall below a threshold distance to the average or predominate color of the region of the real-world scene on which the virtual object is superimposed. If the color of the virtual object is changed, the newly selected color may be required to be at least a threshold distance away from the predominate or average color of the region of the real-world scene on which the virtual object is superimposed in the Lab color space.

In some embodiments, a user may be define (or may use a default) table that defines which colors should be used to present virtual objects based on the predominant or average color of the region of the real-world scene on which the virtual object is to be superimposed. For example, Table 2 may be used to define the colors to be used for the virtual object. "Background" may refer to the color of the region of the real-world scene on which the virtual object is to be superimposed. "Foreground" may refer to the color to use for the virtual object.

TABLE 2

| Background | Foreground |
|---|---|
| White | Black |
| Black | White |
| Orange | Blue |
| Dark Blue | Orange |
| Red | Light Gray |
| Brown | Light Green |
| Green | White |
| Yellow | Maroon |
| Light Blue | Maroon |
| Tan | Black |

At block 340, the virtual object may be displayed to the user using the one or more display colors determined at block 330. Display may occur via a HMD to the user. The color or colors determined may not be used for the entire virtual object, rather only a portion of the virtual object may use the determined display color, such as text of the virtual object. By using the determined display color, the amount of contrast between (at least part of) the virtual object and the portion of the real-world scene onto which the virtual object is superimposed (and/or a portion of the real-world scene surrounding the virtual object) may be increased.

At block 350, due to the higher contrast between at least part of the virtual object and the real-world object onto which the virtual object is superimposed, the brightness of the displayed virtual object on the HMD may be decreased while maintaining sufficient visibility to the user. The amount of brightness that is necessary to maintain "sufficient visibility" to the user may be defined through the user preferences. This sufficient visibility characteristic, which may be defined by the user, may be translated into a distance for use in determining a minimum distance in the Lab color space. (For example, the greater the contrast specified by the sufficient visibility characteristics, the greater the distance used for the contrasting color in the Lab color space.

At block 360, the amount of power consumed by the HMD performing block 340 may be decreased compared to the situation if a display color was used that had less contrast over the color of the superimposed real-world object. Since a greater contrasting color may be used to display the virtual object, the brightness of the displayed virtual object may be decreased at block 350. This decrease in brightness may result in the HMD consuming less power in displaying the virtual object.

The amount of battery charge may affect how virtual objects are displayed. The color (and the brightness) of the virtual objects may only be adjusted to preserve battery life when the battery is below a charge threshold, such as 25%. Such settings may be user defined. As such, method 300 may not be performed until the AR device's battery charge level reaches a threshold level.

Figure 4:
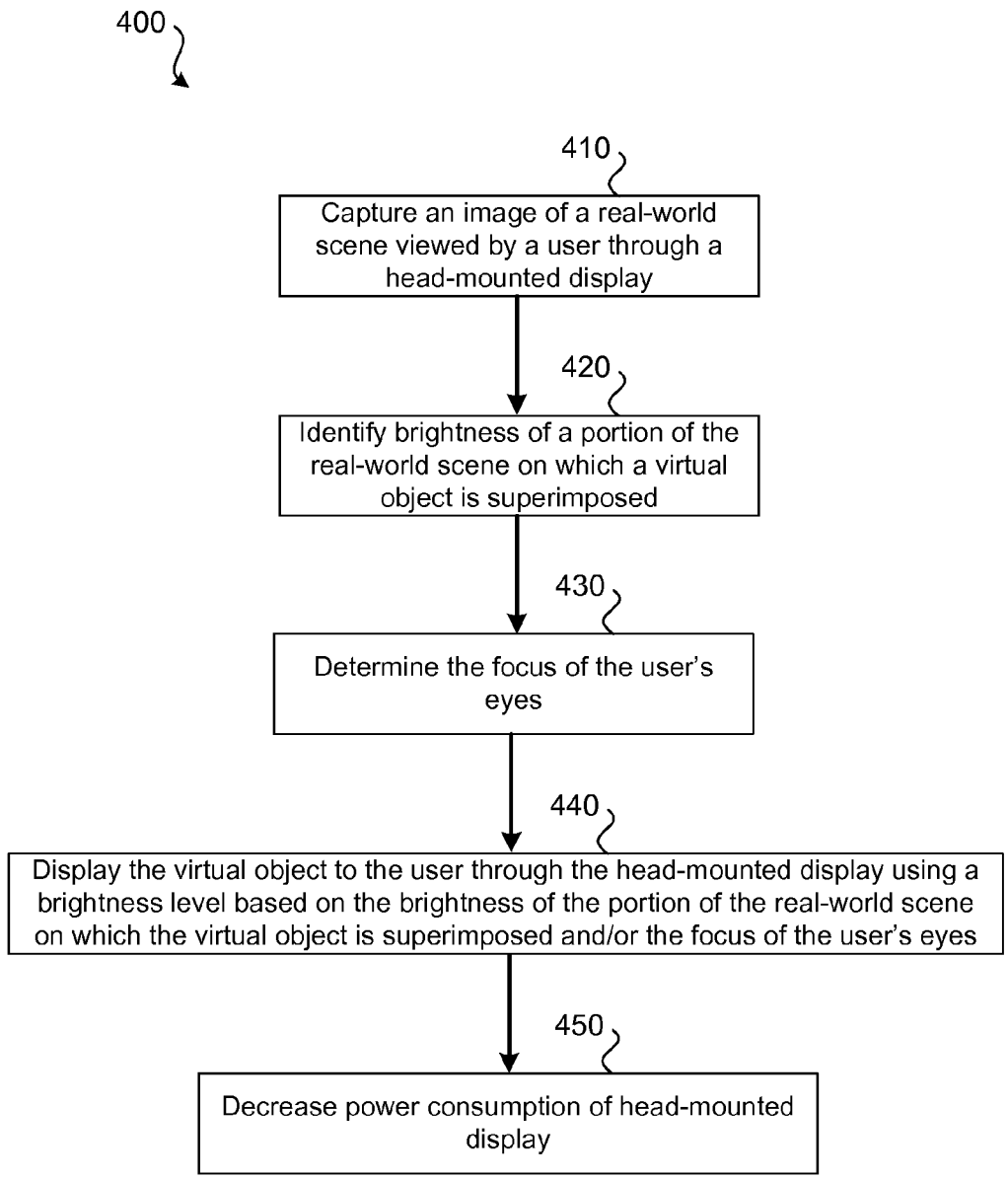
FIG. 4 illustrates an embodiment of a method for adjusting the brightness of a virtual object in response to a real-world scene and/or the user's focus.

FIG. 4 illustrates an embodiment of a method for adjusting the brightness of a virtual object in response to objects of a real-world scene. Method 400 may be performed using an augmented reality (AR) device, such as an AR device that includes system 100 or some other system that is configured to display virtual objects using an HMD to a user. A computerized device, such as computer system 900 of FIG. 9 may be used to perform at least some blocks of method 400. Means for performing method 400 include one or more: computerized devices, cameras, head-mounted displays, and power sources. Means for performing method 400 may include one or more of the modules of system 100. Means for performing method 400 may include one or more processors. Method 400 may be performed in conjunction with one or more blocks of method 300 of FIG. 3.

At block 410, an image of a real-world scene may be captured by an AR device. Such an image may be captured using a camera. The camera may be directed to capture the same or a similar point of view as the user's eyes. As such, an image captured by the camera may contain a field of view that intersects the user's field of view. Images may be captured periodically, such as multiple times per second. Such images may be passed to a processing module of the AR device.

At block 420, the brightness of real-world objects present in a region of a real-world scene on which a virtual object is currently superimposed or is going to be superimposed may be determined To determine the brightness, the image captured at block 410 may be used. An average brightness across the region or the brightest measurement within the region may be used. The brighter a region is determined to be, the greater the brightness of a virtual object may need to be for sufficient visibility to the user.

In some embodiments, rather than only using the brightness of the region of the real-world scene on which the virtual object is to be superimposed, a predefined number of pixels around the virtual object in the image captured at block 410 may additionally or alternatively be used to determine the brightness to be used for displaying the virtual object. For instance, if a bright real-world object is present, as viewed, directly to the side of the virtual object, the brightness of the virtual object may be increased for sufficient visibility to the user.

At block 430, the depth of focus and/or the direction of focus of the user's eyes may be determined. The brightness of virtual objects may be adjusted based on the focus of the user's eyes. If a user is looking in a direction away from a virtual object and/or is not focusing on the virtual plane on which a virtual object is projected, the brightness of the virtual object may be decreased. For instance, a virtual object containing text may only need to be bright enough to be readable when the user is looking directly at the virtual object and focusing on the virtual plane on which the virtual object is projected. Otherwise, the virtual object may only need to be bright enough for the user to locate the virtual object. As an example, if multiple virtual objects are being presented to a user, only a virtual object, if any, the user is focusing his eyes on may be displayed with a high level of brightness.

At block 440, the virtual object may be displayed to the user using a brightness level based on the brightness level of the region of the real-world scene determined at block 420 and/or based on the focus of the users' eyes as determined at block 430. Accordingly, the brightness of the virtual object may be maintained to be visible over the real-world object upon which the virtual object is superimposed. A user preference may be used to determine how many lumens brighter a virtual object should appear as compared to the real-world object that the virtual object is superimposed over in order to maintain sufficient visibility to the user. A user may define a "brightness contrast characteristic" which may be used to determine a minimum difference in lumens between a virtual object and the region of a real-world scene the virtual object is superimposed over. By adjusting the brightness level of the virtual object, when a virtual object is superimposed over a dim real-world object, the amount of brightness used to present the virtual object by the HMD may be reduced, thus possibly resulting in less power being consumed by the HMD.

At block 450, the amount of power consumed by the HMD performing block 440 may be decreased compared to the situation if a greater brightness level was used for presenting the virtual object. The decrease in brightness may result in the HMD consuming less power in displaying the virtual object.

The amount of battery charge may affect how virtual objects are displayed. The brightness of the virtual objects may only be adjusted to preserve battery life when the battery is below a charge threshold, such as 25%. Such settings may be user defined. As such, method 400 may not be performed until the AR device's battery charge level reaches a threshold level.

Figure 5:
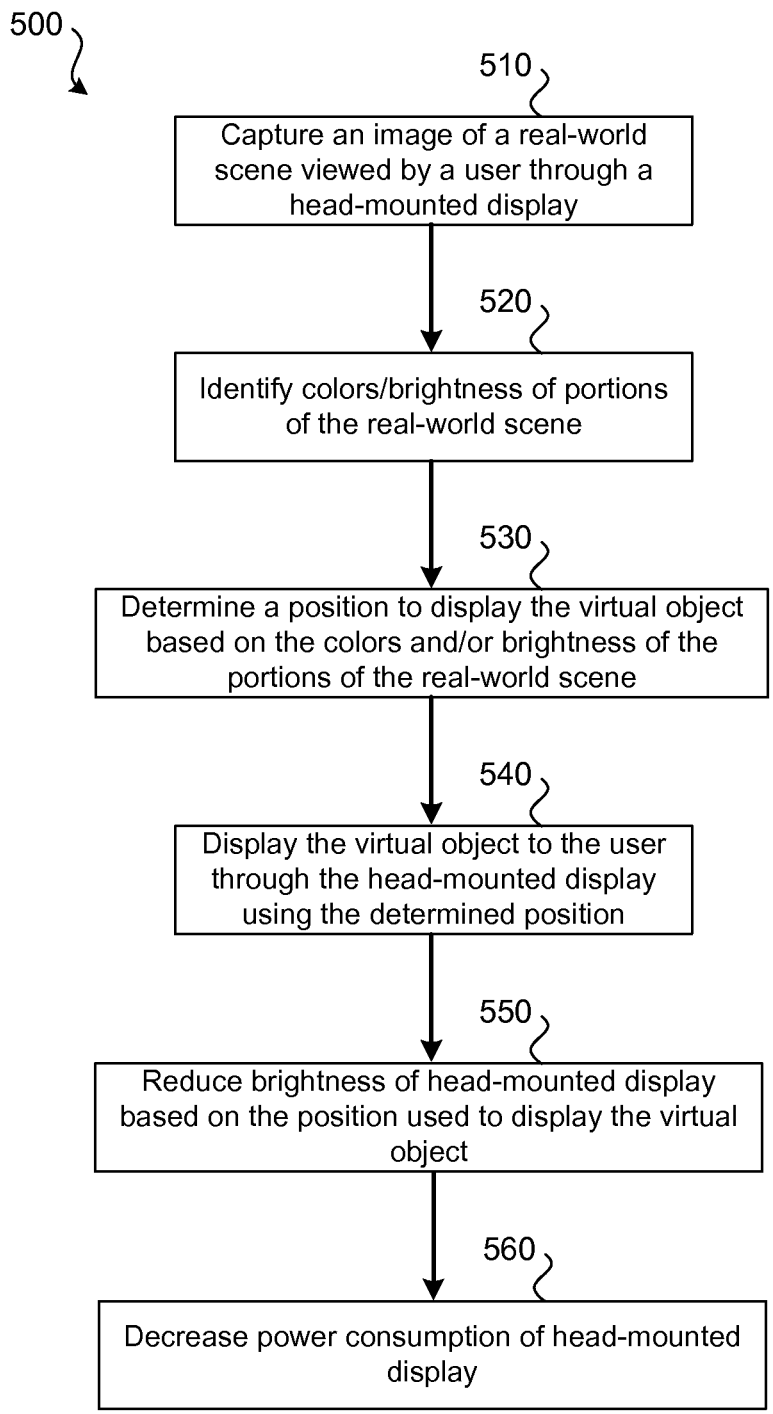
FIG. 5 illustrates an embodiment of a method for adjusting the position of a virtual object in response to the brightness of a real-world scene.

FIG. 5 illustrates an embodiment of a method for adjusting the position of a virtual object in response to the brightness of objects of a real-world scene. Method 500 may be performed using an augmented reality (AR) device, such as an AR device that includes system 100 or some other system that is configured to display virtual objects using an HMD to a user. A computerized device, such as computer system 900 of FIG. 9 may be used to perform at least some blocks of method 500. Means for performing method 500 include one or more: computerized devices, cameras, head-mounted displays, and power sources. Means for performing method 500 may include one or more of the modules of system 100. Means for performing method 500 may include one or more processors. Method 500 may be performed in conjunction with one or more blocks of method 300 of FIG. 3 and/or method 400 of FIG. 4.

At block 510, an image of a real-world scene may be captured by an AR device. Such an image may be captured using a camera. The camera may be directed to capture the same or a similar point of view as the user's eyes. As such, an image captured by the camera may contain a field of view that intersects the user's field of view. Images may be captured periodically, such as multiple times per second. Such images may be passed to a processing module of the AR device.

At block 520, the brightness of real-world objects present in the real-world scene may be determined To determine the brightness, the image captured at block 510 may be used. An average brightness of various regions of the real-world scene may be determined. The brighter a region is determined to be, the greater the brightness of a superimposed virtual object may need to be for sufficient visibility to the user. Also at block 520, one or more colors present in various regions of the real-world scene may be determined. To determine the colors, the image captured at block 510 may be analyzed. If multiple colors are present, the predominate or average color may be determined for various regions of the real-world scene. In some embodiments, an RGB component for each pixel in a region of the image may be averaged to determine an average color. Using such an RGB component may factor in the brightness of the pixels (the greater each component value, the greater the measured brightness).

At block 530, based on the brightness and/or colors of real-world objects within the scene identified at block 520, the position of virtual objects presented to the user via the HMD may be selected. The positions may be determined to maximize power savings by decreasing the lumen output of an HMD necessary to sufficiently illuminate the virtual object for visibility to the user. As such, darker regions of the real-world scene and/or regions of the scene that have a consistent color may be used to display one or more virtual objects. Further, it may be more power-efficient to project virtual objects over certain colors. For instance, superimposing a virtual object over a blue real-world object may not require as much light output by a display (while maintaining visibility to a user) as a virtual object superimposed over a white real-world object.

At block 540, a virtual object may be displayed to the user in the position determined at block 530. This may involve moving the virtual object from a first display position to a second display position. By adjusting the position of a virtual object, the amount of brightness used to present the virtual object by the HMD may be reduced by superimposing the virtual object over a dim region of the real-world scene (relative to other regions of the real-world scene) or a selected color real-world object (e.g., a dark colored real-world object).

A threshold time may be set such that a virtual object is not moved overly often. For instance, once a virtual object is moved, it may not be eligible to be moved again for a defined period of time, such as one minute. In some embodiments, if the user's head is detected to move around, the virtual object may not move for a period of time. The virtual object may only be repositioned once the user's head has been looking in a particular direction for a period of time, such as 30 seconds. As an example of this, if a user is walking down a hallway and his field-of-view is constantly changing, the position of virtual objects may not be rearranged. However, once the user sits down at his desk and is looking at his computer screen for a period of time, such as 30 seconds, the virtual objects may be eligible to be repositioned (such as off to the side of the computer screen over a darker portion of the real-world scene viewed by the user).

At block 550, due to the contrast and/or brightness differential between at least part of the virtual object and the region of the real-world scene onto which the virtual object is superimposed (and, possibly, a region around the virtual object), the brightness of the displayed virtual object on the HMD may be decreased while maintaining visibility of the virtual object to the user. The amount of brightness that is necessary to maintain "sufficient visibility" to the user may be defined through the user preferences.

At block 560, the amount of power consumed by the display performing block 540 may be decreased as compared to if a higher brightness and/or a different color was used to display the virtual object without repositioning the virtual object. The amount of battery charge may affect how virtual objects are displayed. The position of the virtual objects may only be adjusted to preserve battery life when the battery is below a charge threshold, such as 25%. Such settings may be user defined. As such, method 500 may not be performed until the AR device's battery charge level reaches a threshold level.

Figure 6:
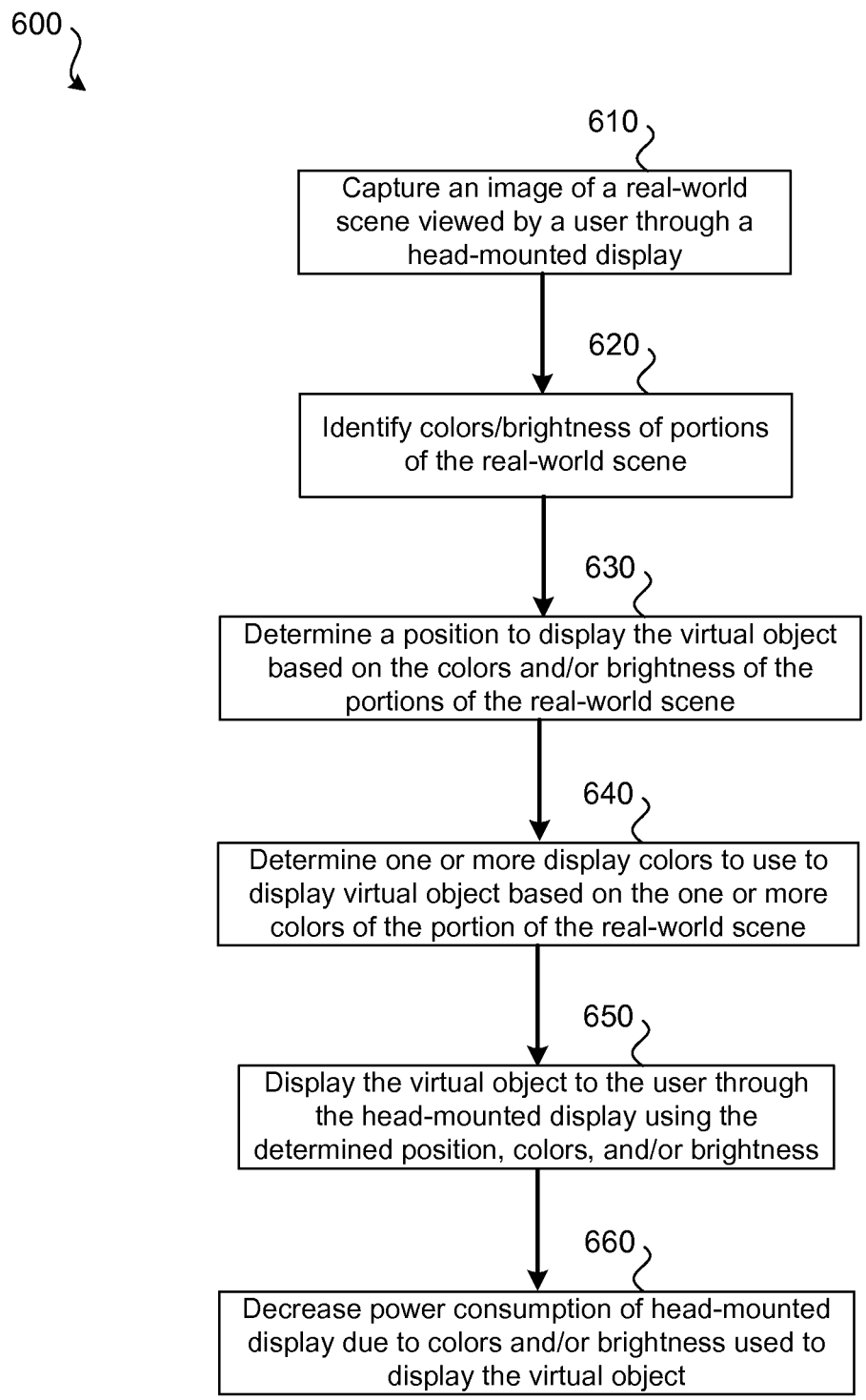
FIG. 6 illustrates an embodiment of a method for adjusting the brightness, color, and position of a virtual object in response to the colors and brightness of a real-world scene.

FIG. 6 illustrates an embodiment of a method for adjusting the position of a virtual object in response to a priority of objects present in a real-world scene. Method 600 may be performed using an augmented reality (AR) device, such as an AR device that includes system 100 or some other system that is configured to display virtual objects using an HMD to a user. A computerized device, such as computer system 900 of FIG. 9 may be used to perform at least some blocks of method 600. Means for performing method 600 include one or more: computerized devices, cameras, head-mounted displays, and power sources. Means for performing method 600 may include one or more of the modules of system 100. Means for performing method 600 may include one or more processors. Method 600 may be performed in conjunction with one or more blocks of method 300 of FIG. 3, method 400 of FIG. 4, and/or method 500 of FIG. 5.

At block 610, an image of a real-world scene may be captured by an AR device. Such an image may be captured using a camera. The camera may be directed to capture the same or a similar point of view as the user's eyes. As such, an image captured by the camera may contain a field of view that intersects the user's field of view. Images may be captured periodically, such as multiple times per second. Such images may be passed to a processing module of the AR device.

At block 620, the brightness of real-world objects present in the real-world scene may be determined To determine the brightness, the image captured at block 610 may be used. An average brightness of various regions of the real-world scene may be determined. The brighter a region is determined to be, the greater the brightness of a superimposed virtual object may need to be for sufficient visibility to the user. Also at block 620, one or more colors present in various regions of the real-world scene may be determined. To determine the colors, the image captured at block 610 may be analyzed. If multiple colors are present, the predominate or average color may be determined for various regions of the real-world scene. In some embodiments, an RGB component for each pixel in a region of the image may be averaged to determine an average color. Using such an RGB component may factor in the brightness of the pixels (the greater each component value, the greater the measured brightness).

At block 630, based on the brightness and/or colors of real-world objects within the scene identified at block 620, the position of virtual objects presented to the user via the HMD may be selected. The positions may be determined to maximize power savings by decreasing the lumen output of an HMD necessary to sufficiently illuminate the virtual object for visibility to the user. As such, darker regions of the real-world scene and/or regions of the scene that have a consistent color may be used to display one or more virtual objects. Further, it may be more power-efficient to project virtual objects over certain colors. For instance, superimposing a virtual object over a blue real-world object may not require as much light output by a display (while maintaining visibility to a user) as a virtual object superimposed over a white real-world object.

At block 640, one or more display colors may be determined using the one or more colors, predominant color, or average color identified at block 620. In order to maximize (or at least increase) contrast between the background of the real-world scene and the virtual object superimposed on the region of the real-world scene, complementary colors may be determined, such as colors on opposite sides of a color wheel. User preferences (such as colors to use or not use) may be used in determining which colors are selected for use in displaying virtual objects. A color wheel or the Lab color space may be used for determining the one or more display colors (as detailed in relation to block 330).

In some embodiments, it may be determined whether it is more efficient to update color or position in order to decrease brightness (rather than changing both). For example, if a real-world scene is uniformly bright, the contrast of the virtual object may be adjusted. However, if the real-world scene has a darkened area, the virtual object may instead be repositioned without the contrast being adjusted. Whether one or both characteristics can be adjusted simultaneously (in order to adjust brightness) may be defined according to user preferences.

At block 650, a virtual object may be displayed to the user in the position, one or more colors, and/or brightness determined at block 630 and block 640. This may involve moving the virtual object from a first display position to a second display position. By adjusting the position of a virtual object, the amount of brightness used to present the virtual object by the HMD may be reduced by superimposing the virtual object over a dim region of the real-world scene (relative to other regions of the real-world scene) or a selected color real-world object (e.g., a dark colored real-world object).

A threshold time may be set such that a virtual object is not moved, changed in color, and/or changed in brightness overly often. For instance, once a virtual object is moved, it may not be eligible to be modified again for a defined period of time, such as one minute. In some embodiments, if the user's head is detected to move around, the virtual object may not move for a period of time. The virtual object may only be repositioned once the user's head has been looking in a particular direction for a period of time, such as 30 seconds.

When a virtual object is moved, rather than the virtual object disappearing from the first position and reappearing at the second position, the virtual object may visually "slide" from the first position to the second position. In some embodiments, all virtual objects may be rearranged, recolored, and/or adjusted in brightness (if a change is determined to be beneficial) at the same time. As such, the presentation of virtual objects would appear to change to a user at the same time. The virtual object that a user interacts with the most (possibly based on the time the user spends focusing his eyes on the virtual object), may be positioned over the darkest area of the real-world scene, such that the brightness of the most popular virtual object can be maintained lower than other virtual objects being displayed. As such, if the brightness of a virtual object is increased when a user is looking at it, the brightness of the virtual object looked at most frequently may be maintained at a lower lumen level, while maintaining visibility.

At block 660, the amount of power consumed by the HMD may be decreased as compared to if a different position, higher brightness and/or a different color was used to display the virtual object without repositioning or recoloring the virtual object. The amount of battery charge may affect how virtual objects are displayed. The position, color, and/or the brightness of the virtual objects may only be adjusted to preserve battery life when the battery is below a charge threshold, such as 25%. Such settings may be user defined. As such, method 600 may not be performed until the AR device's battery charge level reaches a threshold level.

Figure 7:
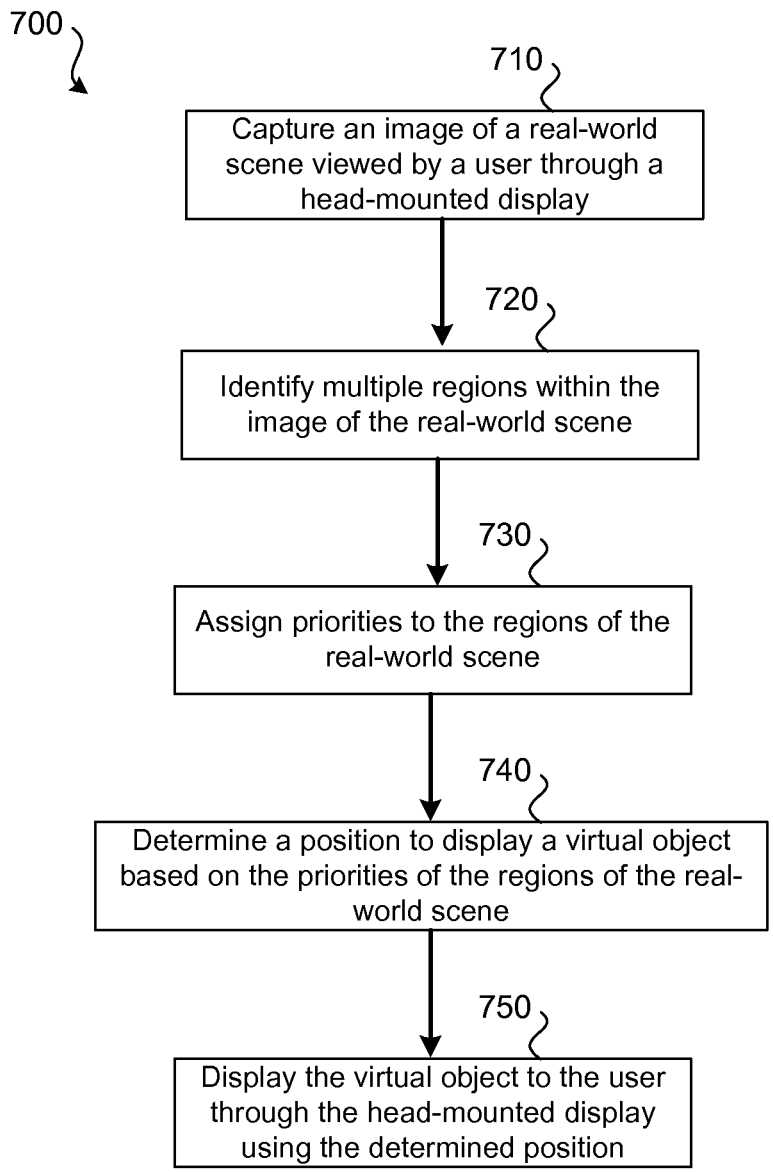
FIG. 7 illustrates an embodiment of a method for adjusting the position of a virtual object in response to the priorities of regions of a real-world scene.

FIG. 7 illustrates an embodiment of a method for adjusting the position of a virtual object in response to a priority of objects present in a real-world scene. Method 700 may be performed using an augmented reality (AR) device, such as an AR device that includes system 100 or some other system that is configured to display virtual objects using an HMD to a user. A computerized device, such as computer system 900 of FIG. 9 may be used to perform at least some blocks of method 700. Means for performing method 700 include one or more: computerized devices, cameras, head-mounted displays, and power sources. Means for performing method 700 may include one or more of the modules of system 100. Means for performing method 700 may include one or more processors. Method 700 may be performed in conjunction with one or more blocks of method 300 of FIG. 3, method 400 of FIG. 4, method 500 of FIG. 5, and/or method 600 of FIG. 6.

At block 710, an image of a real-world scene may be captured by an AR device. Such an image may be captured using a camera. The camera may be directed to capture the same or a similar point of view as the user's eyes. As such, an image captured by the camera may contain a field of view that intersects the user's field of view. Images may be captured periodically, such as multiple times per second. Such images may be passed to a processing module of the AR device.

At block 720, various portions of the real-world scene, as captured in the image of block 710, may be identified. Each region may be required to be at least a minimum, predefined size (e.g., large enough to contain a virtual object). Each region may be defined based on one or more real-world objects in the real-world scene. For instance, if a person is in the scene, the person may be contained within a single region. In some embodiments, the person's body and face may be in separate regions. To define the regions, various real-world objects may be identified. For instance, if a chair is determined to be present within the real-world scene, a region may be defined to at least include the chair. Regions may be created based on real-world objects, brightness, color, pattern variability (e.g., little variability, such as a blank wall, or high variability, such as various books on a bookshelf), color variability (e.g., lots of colors, few colors), text (whether text is or is not present), etc. In some embodiments, only some portions of the virtual field of view may be included in a region. For instance, unidentified real-world objects may be ignored and may not have a region defined around them. Two or more regions may be defined. In some embodiments, a maximum number of regions may be permitted to be defined.

At block 730, priorities may be assigned to the regions identified at block 720. A priority may be based on user preferences and/or real-world objects identified within the real-world scene. For example, common real-world objects that may be identified include: faces, display screens (e.g., mobile device display screens, computer display screens, televisions), text (e.g., books, magazines, documents), pictures, ceilings, walls, and floors. Table 1 provides additional examples. Real-world objects such as faces may be given a higher priority over real-world objects such as floors. This may reflect that a user would rather have a virtual object superimposed over a floor than over a person's face. Within a set of user preferences, a user may be able to specify rankings of different types of real-world objects. In some embodiments, the priority ranking of various real-world objects may be determined without user preferences. In some embodiments, real-world objects exhibiting motion are given priority over static real-world objects. Real-world objects that are illuminated (e.g., a display screen, a book lit by a lighting fixture) over a threshold value, may be given priority over real-world objects that are not illuminated greater than the threshold value (e.g., an unlit room, a powered down computer screen). The threshold value may be based on the average lumen level in the real-world scene viewed by the user, default, or a user-defined threshold.

At block 740, a position to display a virtual object is selected based on the multiple regions defined at block 720 and the priorities assigned at block 730. The lowest priority region (which corresponds to the lowest priority real-world object(s) in the scene) may be selected for a virtual object to be superimposed over. It may be determined whether the region is large enough for the virtual object to fit (virtual objects may vary in size). If not, the next lowest priority region may be selected. Further, if a region already has a virtual object superimposed over it, another region may be selected. Referring to FIG. 2B as an example, one region may include person 225, another region may include floor 245, a third region may include wall 235, and a fourth region may include display 210. The region including floor 245 may be the lowest priority and may be selected as the region where a virtual object is to be positioned for display.

At block 750, the virtual object may be displayed to the user in the region determined on the basis of priority at block 740. At block 750, due to the contrast between at least part of the virtual object and the real-world object onto which the virtual object is superimposed, the brightness and/or color of the displayed virtual object on the HMD may be decreased or modified while maintaining sufficient visibility of the virtual object to the user. The amount of power consumed by the display performing block 750 may be decreased compared to the situation if a display color was used that had less contrast over the color of the superimposed real-world object.

As the user's view of the real-world scene changes, method 700 may be repeated to identify the regions now present in a new image of the real-world scene and, possibly, reposition one or more virtual objects. As such, as a user's real-world view changes, the position of the virtual objects may be modified based on new regions and their associated priorities. In some embodiments, to prevent the virtual objects from being constantly repositioned, based on the movement of the user's head (or, more generally, the user's body), it may be determined when the user has been looking in a particular direction for at least a threshold period of time. Once the threshold is met, the virtual objects may be repositioned. Therefore, if the user is repeatedly moving his head, the virtual objects may not be repositioned until the user is looking in particular direction for at least a threshold period of time. Additionally, in some embodiments, repositioning of the virtual objects may only be permitted periodically. For instance, at least a threshold period of time may need to elapse since the last time the position of the virtual objects were assigned and displayed. In some embodiments, the user may be required to provide an authorizing input in order to permit arranging of the virtual objects.

Figure 8:
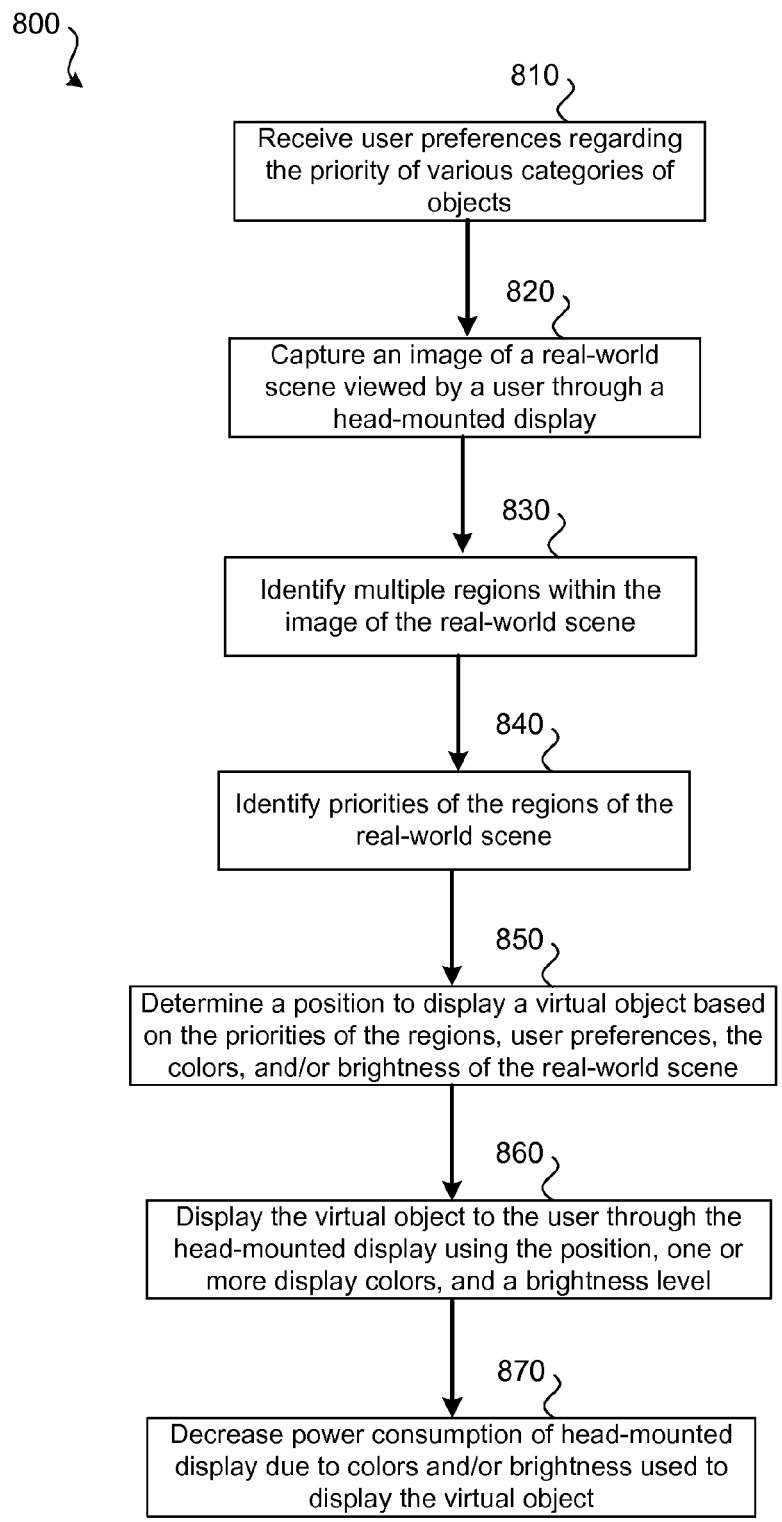
FIG. 8 illustrates an embodiment of a method for adjusting the position of a virtual object in response to the priorities of regions of a real-world scene, colors of the real-world scene, brightness of the real-world scene, and user preferences.

FIG. 8 illustrates an embodiment of a method for adjusting the position of a virtual object in response to a priority of objects present in a real-world scene. Method 800 may be performed using an augmented reality (AR) device, such as an AR device that includes system 100 or some other system that is configured to display virtual objects using an HMD to a user. A computerized device, such as computer system 900 of FIG. 9 may be used to perform at least some blocks of method 800. Means for performing method 800 include one or more: computerized devices, cameras, head-mounted displays, and power sources. Means for performing method 800 may include one or more of the modules of system 100. Means for performing method 800 may include one or more processors. Method 800 may be performed in conjunction with one or more blocks of method 300 of FIG. 3, method 400 of FIG. 4, method 500 of FIG. 5, method 600 of FIG. 6, and/or method 700 of FIG. 7.

At block 810, user preferences may be received regarding the priority of various categories of objects, similar to Table 1. In some embodiments, these user preferences may be determined without the user having to specifically rank categories of objects. For instance, based on the real-world objects that a user typically interacts with, a ranking may be created. For instance, if the user reads frequently text may be given a high priority. Alternatively, if the user spends more time talking face-to-face with persons, other people may be afforded a higher priority over text. These user preferences may also indicate how position, color, and/or brightness of virtual objects should be handled.

At block 820, an image of a real-world scene may be captured by an AR device. Such an image may be captured using a camera. The camera may be directed to capture the same or a similar point of view as the user's eyes. As such, an image captured by the camera may contain a field of view that intersects the user's field of view. Images may be captured periodically, such as multiple times per second. Such images may be passed to a processing module of the AR device.

At block 830, various portions of the real-world scene, as captured in the image of block 820, may be identified. Each region may be required to be at least a minimum, predefined size (e.g., large enough to contain a virtual object). Each region may be defined based on the real-world objects in the real-world scene. For instance, if a person is in the scene, the person may be contained within a single region. In some embodiments, the person's body and face may be in separate regions. To define the regions, various real-world objects may be identified. For instance, if a chair is determined to be present within the real-world scene, a region may be defined to at least include the chair. Regions may be created based on real-world objects, brightness, color, pattern variability (e.g., little variability, such as a blank wall, or high variability, such as various books on a bookshelf), color variability (e.g., lots of colors, few colors), text (whether text is or is not present), etc. In some embodiments, only some portions of the virtual field of view may be included in a region. For instance, unidentified real-world objects may be ignored and may not have a region defined around them. Two or more regions may be defined. In some embodiments, a maximum number of regions may be permitted to be defined.

At block 840, priorities may be assigned to the regions identified at block 820. A priority may be based on user preferences and/or real-world objects identified within the real-world scene. For example, common real-world objects that may be identified include: faces, display screens (e.g., mobile device display screens, computer display screens, televisions), text (e.g., books, magazines, documents), pictures, ceilings, walls, and floors. Table 1 provides additional examples. Real-world objects such as faces may be given a higher priority over real-world objects such as floors. This may reflect that a user would rather have a virtual object superimposed over a floor than over a person's face. Within a set of user preferences, a user may be able to specify rankings of different types of real-world objects. In some embodiments, the priority ranking of various real-world objects may be determined without user preferences. In some embodiments, real-world objects exhibiting motion are given priority over static real-world objects. Real-world objects that are illuminated (e.g., a display screen, a book lit by a lighting fixture) over a threshold value, may be given priority over real-world objects that are not illuminated greater than the threshold value (e.g., an unlit room, a powered down computer screen). The threshold value may be based on the average lumen level in the real-world scene viewed by the user, default, or a user-defined threshold.

At block 850, based on the brightness and/or colors of real-world objects within the scene identified at block 820, the position of virtual objects presented to the user via the HMD may be selected. The positions may be determined to maximize power savings by decreasing the lumen output of an HMD necessary to sufficiently illuminate the virtual object for visibility to the user. As such, darker regions of the real-world scene and/or regions of the scene that have a consistent color may be used to display one or more virtual objects. Further, it may be more power-efficient to project virtual objects over certain colors. For instance, superimposing a virtual object over a blue real-world object may not require as much light output by a display (while maintaining visibility to a user) as a virtual object superimposed over a white real-world object.

Further, at block 850, a position to display a virtual object may be selected based on the multiple regions defined at block 830 and the priorities assigned at block 840. The lowest priority region (which corresponds to the lowest priority real-world object(s) in the scene) may be selected for a virtual object to be superimposed over. It may be determined whether the region is large enough for the virtual object to fit (virtual objects may vary in size). If not, the next lowest priority region may be selected. Further, if a region already has a virtual object superimposed over it, another region may be selected.

As such, 1) priority; 2) color; and 3) brightness may be used in combination to determine display position and color and/or brightness of the displayed virtual object. In some embodiments, a weighted arrangement may be used to determine whether a region's priority or its brightness should be used in determining whether a virtual object should be superimposed over the region of the real-world scene. For example, a high-priority region may be dark (e.g., chalkboard), while a low priority region may be bright (e.g., the sky). In some embodiments, the lowest priority region is selected first, then the virtual object's color and brightness is selected to be appropriate for display in that region.

At block 860, a virtual object may be displayed to the user based on the priority, position, one or more colors, and/or brightness determined at block 850. This may involve moving the virtual object from a first display position to a second display position. By adjusting the position of a virtual object, the amount of brightness used to present the virtual object by the HMD may be eligible to be reduced if the virtual object is superimposed over a dim region of the real-world scene (relative to other regions of the real-world scene) or a selected color real-world object (e.g., a dark colored real-world object).

A threshold time may be set such that a virtual object is not moved, changed in color, and/or changed in brightness overly often. For instance, once a virtual object is moved, it may not be eligible to be modified again for a defined period of time, such as one minute. In some embodiments, if the user's head is detected to move around, the virtual object may not move for a period of time. The virtual object may only be repositioned once the user's head has been looking in a particular direction for a period of time, such as 30 seconds.

At block 870, the amount of power consumed by the HMD may be decreased as compared to if a different position, higher brightness and/or a different color was used to display the virtual object without repositioning or recoloring the virtual object. The amount of battery charge may affect how virtual objects are displayed. The position, color, and/or the brightness of the virtual objects may only be adjusted to preserve battery life when the battery is below a charge threshold, such as 25%. Such settings may be user defined. As such, method 600 may not be performed until the AR device's battery charge level reaches a threshold level.

FIG. 9 illustrates an embodiment of a computer system. A computer system as illustrated in FIG. 9 may incorporate part of the previously described computerized devices. For example, computer system 900 can represent some of the components of the augmented reality devices discussed in this application. FIG. 9 provides a schematic illustration of one embodiment of a computer system 900 that can perform the methods provided by various embodiments, as described herein. Computer system 900 may perform the functions of at least some components of system 100 of FIG. 1. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, scope of the claims is not bound by the above description.

What is claimed is:

1. A system for controlling an augmented reality display, the system comprising:
a head-mounted display, configured to present a virtual field of view comprising a virtual object superimposed on a real-world scene; and
a controller, configured to:
modify a display of the virtual object using a second color to display the virtual object via the head-mounted display, wherein the second color contrasts with and is selected based on a first color of a real-world object in the real-world scene, wherein the virtual object in the virtual field of view is superimposed over the real-world object; and
decrease a lumen output of the head-mounted display for displaying the virtual object based on an amount of contrast between the first color of the real-world object in the real-world scene and the second color.

2. The system for controlling the augmented reality display of claim 1, wherein the second color has at least a predefined amount of color contrast with the first color of the real-world object.

3. The system for controlling the augmented reality display of claim 2, wherein the predefined amount of color contrast is determined based on a minimum distance between the first color and the second color in the Lab color space.

4. The system for controlling the augmented reality display of claim 2, the system further comprising:
a battery, wherein the controller is further configured to modify the display of the virtual object if a charge level of the battery is below a predefined threshold.

5. The system for controlling the augmented reality display of claim 4, wherein power consumption of the head-mounted display is decreased by decreasing the lumen output of the head-mounted display for displaying the virtual object.

6. The system for controlling the augmented reality display of claim 1, wherein the controller is further configured to:
modify the display of the virtual object by moving the virtual object to be displayed, via the head-mounted display, from a first location to a second location within the virtual field of view of the head-mounted display.

7. The system for controlling the augmented reality display of claim 6, wherein the controller is further configured to:
wait a predefined period of time before moving the virtual object from the first location to the second location within the virtual field of view of the head mounted display.

8. The system for controlling the augmented reality display of claim 1, the system further comprising:
a camera, configured to monitor a focus of a user's eyes, wherein
the controller is further configured to decrease a brightness level of the virtual object when the user's eyes are focused away from the virtual object.

9. A method for controlling an augmented reality display, the method comprising:
presenting, by a head-mounted display, a virtual field of view comprising a virtual object superimposed on a real-world scene;
modifying a display of the virtual object using a second color that contrasts with and is selected based on a first color of a real-world object in the real-world scene, wherein the virtual object in the virtual field of view is superimposed over the real-world object; and
decreasing a lumen output of the head-mounted display for displaying the virtual object based on an amount of contrast between the first color of the real-world object in the real-world scene and the second color.

10. The method for controlling the augmented reality display of claim 9, wherein the second color has at least a predefined amount of color contrast with the first color of the real-world object.

11. The method for controlling the augmented reality display of claim 10, further comprising:
determining the predefined amount of color contrast based on a minimum distance between the first color and the second color in the Lab color space.

12. The method for controlling the augmented reality display of claim 10, further comprising:
modifying the display of the virtual object if a charge level of a battery coupled with the augmented reality display is below a predefined threshold.

13. The method for controlling the augmented reality display of claim 12, further comprising:
decreasing power consumption of the head-mounted display by decreasing the lumen output of the head-mounted display for displaying the virtual object.

14. The method for controlling the augmented reality display of claim 9, further comprising:

modifying the display of the virtual object by moving the virtual object from a first location to a second location within the virtual field of view of the head-mounted display.

15. The method for controlling the augmented reality display of claim 14, further comprising:
waiting a predefined period of time before moving the virtual object from the first location to the second location within the virtual field of view of the head mounted display.

16. The method for controlling the augmented reality display of claim 9, further comprising:
monitoring a focus of a user's eyes; and
decreasing a brightness level of the virtual object when the user's eyes are focused in a direction away from the virtual object.

17. An apparatus for controlling an augmented reality display, the apparatus comprising:
means for presenting a virtual field of view comprising a virtual object superimposed on a real-world scene;
means for modifying a display of the virtual object using a second color that contrasts with and is selected based on a first color of a real-world object in the real-world scene, wherein the virtual object in the virtual field of view is superimposed over the real-world object; and
means for decreasing a lumen output of the head-mounted display for displaying the virtual object based on an amount of contrast between the first color of the real-world object in the real-world scene and the second color.

18. The apparatus for controlling the augmented reality display of claim 15, wherein the second color has at least a predefined amount of color contrast with the first color of the real-world object.

19. The apparatus for controlling the augmented reality display of claim 18, further comprising:
means for determining the predefined amount of color contrast based on a minimum distance between the first color and the second color in the Lab color space.

20. The apparatus for controlling the augmented reality display of claim 18, further comprising:
means for modifying the display of the virtual object if a charge level of a battery coupled with the augmented reality display is below a predefined threshold.

21. The apparatus for controlling the augmented reality display of claim 20, further comprising:
means for decreasing power consumption of the head-mounted display by decreasing the lumen output of the head-mounted display for displaying the virtual object.

22. The apparatus for controlling the augmented reality display of claim 17, further comprising:
means for modifying the display of the virtual object by moving the virtual object from a first location to a second location within the virtual field of view of the head-mounted display.

23. The apparatus for controlling the augmented reality display of claim 22, further comprising:
means for waiting a predefined period of time before moving the virtual object from the first location to the second location within the virtual field of view of the head mounted display.

24. The apparatus for controlling the augmented reality display of claim 17, further comprising:
means for monitoring a focus of a user's eyes; and
means for decreasing a brightness level of the virtual object when the user's eyes are focused in a direction away from the virtual object.

25. A computer program product residing on a non-transitory processor-readable medium for controlling an augmented reality display, the computer program product comprising processor-readable instructions configured to cause a processor to:
cause, via a head-mounted display, a virtual field of view to be displayed comprising a virtual object superimposed on a real-world scene;
modify a display of the virtual object using a second color that contrasts with and is selected based on a first color of a real-world object in the real-world scene, wherein the virtual object in the virtual field of view is superimposed over the real-world object; and
decrease a lumen output of the head-mounted display for displaying the virtual object based on an amount of contrast between the first color of the real-world object in the real-world scene and the second color.

26. The computer program product residing on the non-transitory processor-readable medium for controlling an augmented reality display of claim 25, wherein the second color has at least a predefined amount of color contrast with the first color of the real-world object.

27. The computer program product residing on the non-transitory processor-readable medium for controlling an augmented reality display of claim 26, wherein the processor-readable instructions comprise processor-readable instructions configured to cause the processor to:
determine the predefined amount of color contrast based on a minimum distance between the first color and the second color in the Lab color space.

28. The computer program product residing on the non-transitory processor-readable medium for controlling an augmented reality display of claim 26, wherein the processor-readable instructions comprise processor-readable instructions configured to cause the processor to:
modify the display of the virtual object if a charge level of a battery coupled with the augmented reality display is below a predefined threshold.

29. The computer program product residing on the non-transitory processor-readable medium for controlling an augmented reality display of claim 28, wherein the processor-readable instructions comprise processor-readable instructions configured to cause the processor to:
decrease power consumption of the head-mounted display by decreasing the lumen output of the head-mounted display for displaying the virtual object.

30. The computer program product residing on the non-transitory processor-readable medium for controlling an augmented reality display of claim 25, wherein the processor-readable instructions comprise processor-readable instructions configured to cause the processor to:
modify the display of the virtual object by moving the virtual object from a first location to a second location within the virtual field of view of the head-mounted display.

31. The computer program product residing on the non-transitory processor-readable medium for controlling an augmented reality display of claim 30, wherein the processor-readable instructions comprise processor-readable instructions configured to cause the processor to:
wait a predefined period of time before causing the virtual object to move from the first location to the second location within the virtual field of view of the head-mounted display.

32. The computer program product residing on the non-transitory processor-readable medium for controlling an augmented reality display of claim 25, further comprising:

monitor a focus of a user's eyes; and
decrease a brightness level of the virtual object when the user's eyes are focused in a direction away from the virtual object.

* * * * *